United States Patent
Ishikawa et al.

(10) Patent No.: US 11,017,396 B2
(45) Date of Patent: May 25, 2021

(54) AUTOMATIC TRANSACTION DEVICE AND CONTROL METHOD THEREOF

(71) Applicant: HITACHI-OMRON TERMINAL SOLUTIONS, CORP., Tokyo (JP)

(72) Inventors: Tomoyoshi Ishikawa, Tokyo (JP); Yoshinaga Horii, Tokyo (JP); Norichika Miyamoto, Tokyo (JP); Hisao Ogata, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 279 days.

(21) Appl. No.: 15/745,933

(22) PCT Filed: Aug. 26, 2015

(86) PCT No.: PCT/JP2015/074122
§ 371 (c)(1),
(2) Date: Jan. 18, 2018

(87) PCT Pub. No.: WO2017/033321
PCT Pub. Date: Mar. 2, 2017

(65) Prior Publication Data
US 2018/0211253 A1 Jul. 26, 2018

(51) Int. Cl.
*G06Q 20/40* (2012.01)
*G06Q 20/18* (2012.01)
*G07F 19/00* (2006.01)

(52) U.S. Cl.
CPC .......... *G06Q 20/401* (2013.01); *G06Q 20/18* (2013.01); *G07F 19/20* (2013.01); *G07F 19/203* (2013.01); *G06Q 2220/00* (2013.01)

(58) Field of Classification Search
CPC .. G06Q 20/401; G06Q 20/18; G06Q 2220/00; G07F 19/20; G07F 19/203
See application file for complete search history.

(56) References Cited

U.S. PATENT DOCUMENTS

2008/0195540 A1\* 8/2008 Gee .................... G06Q 20/1085
705/43
2013/0036467 A1 2/2013 Krummel et al.
(Continued)

FOREIGN PATENT DOCUMENTS

JP 2012-238254 A 12/2012
WO WO-2016063588 A1 \* 4/2016 ............. G06Q 20/18

OTHER PUBLICATIONS

International Search Report with English Translation and Written Opinion issued in corresponding application No. PCT/JP2015/074122 dated Oct. 20, 2015.

*Primary Examiner* — Zeshan Qayyum
*Assistant Examiner* — Vincent I Idiake
(74) *Attorney, Agent, or Firm* — Foley & Lardner LLP

(57) ABSTRACT

Proposed are a highly reliable automatic transaction device and a control method thereof. Specifically provided is an automatic transaction device, and a control method thereof, including a main body control unit which generates first withdraw transaction data including amount information as information related to an amount in a withdraw transaction and a withdraw command for instructing a withdraw of a paper currency based on the first withdraw transaction data, a paper currency processing unit which receives the withdraw command and pays out the paper currency, and a first device which is a device that is different from the paper currency processing unit and which determines a feasibility of a withdraw based on the first withdraw transaction data sent from the main body control unit. When the first device determines that the withdraw is possible, the first device generates withdraw credit information with security that is higher than the withdraw command based on the first withdraw transaction data. The paper currency processing unit receives the withdraw credit information and the withdraw command, additionally determines the feasibility of (Continued)

the withdraw based on the withdraw credit information and the withdraw command, and pays out the paper currency when the withdraw is possible.

8 Claims, 31 Drawing Sheets

(56) References Cited

U.S. PATENT DOCUMENTS

| | | | | |
|---|---|---|---|---|
| 2014/0374477 A1* | 12/2014 | Korala | ............... | G07F 17/42 |
| | | | | 235/379 |
| 2016/0125416 A1* | 5/2016 | Spencer | ............ | G06F 21/73 |
| | | | | 705/71 |
| 2017/0308877 A1* | 10/2017 | Cha | .................. | G06Q 20/18 |

* cited by examiner

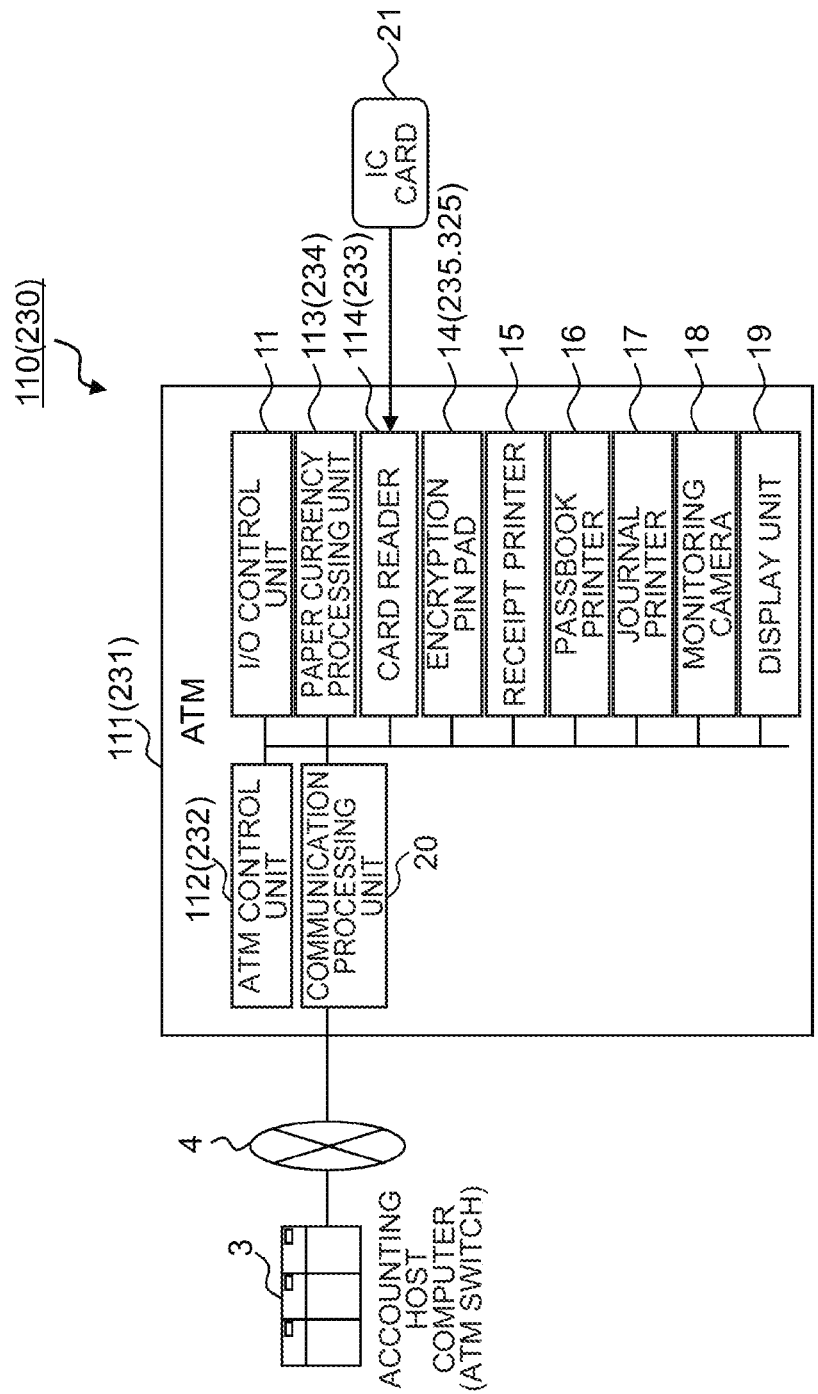

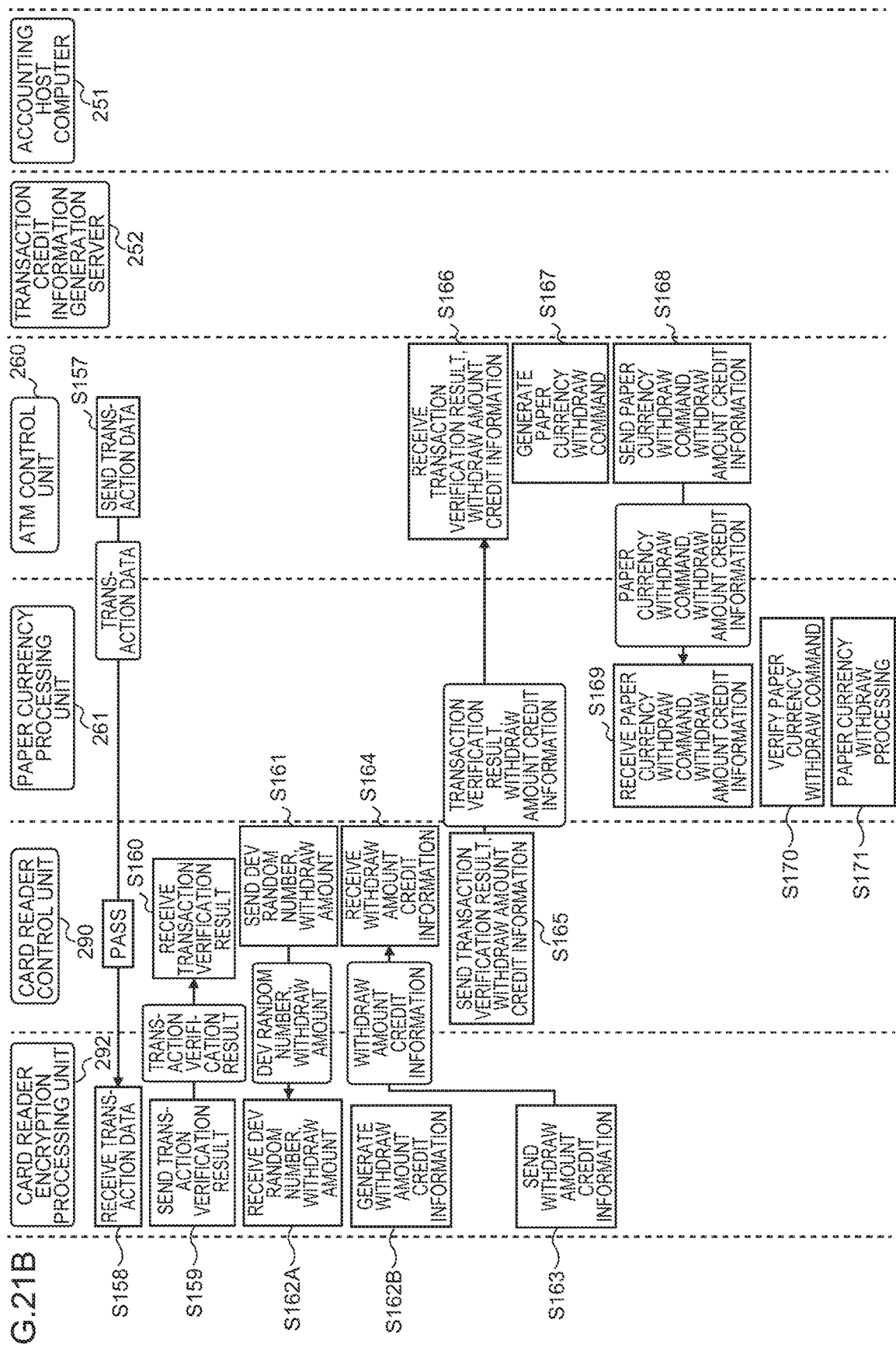

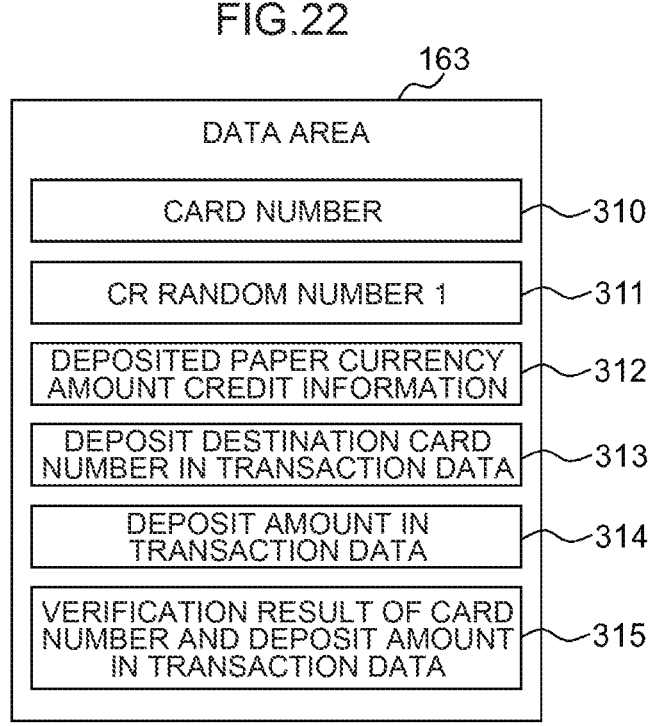

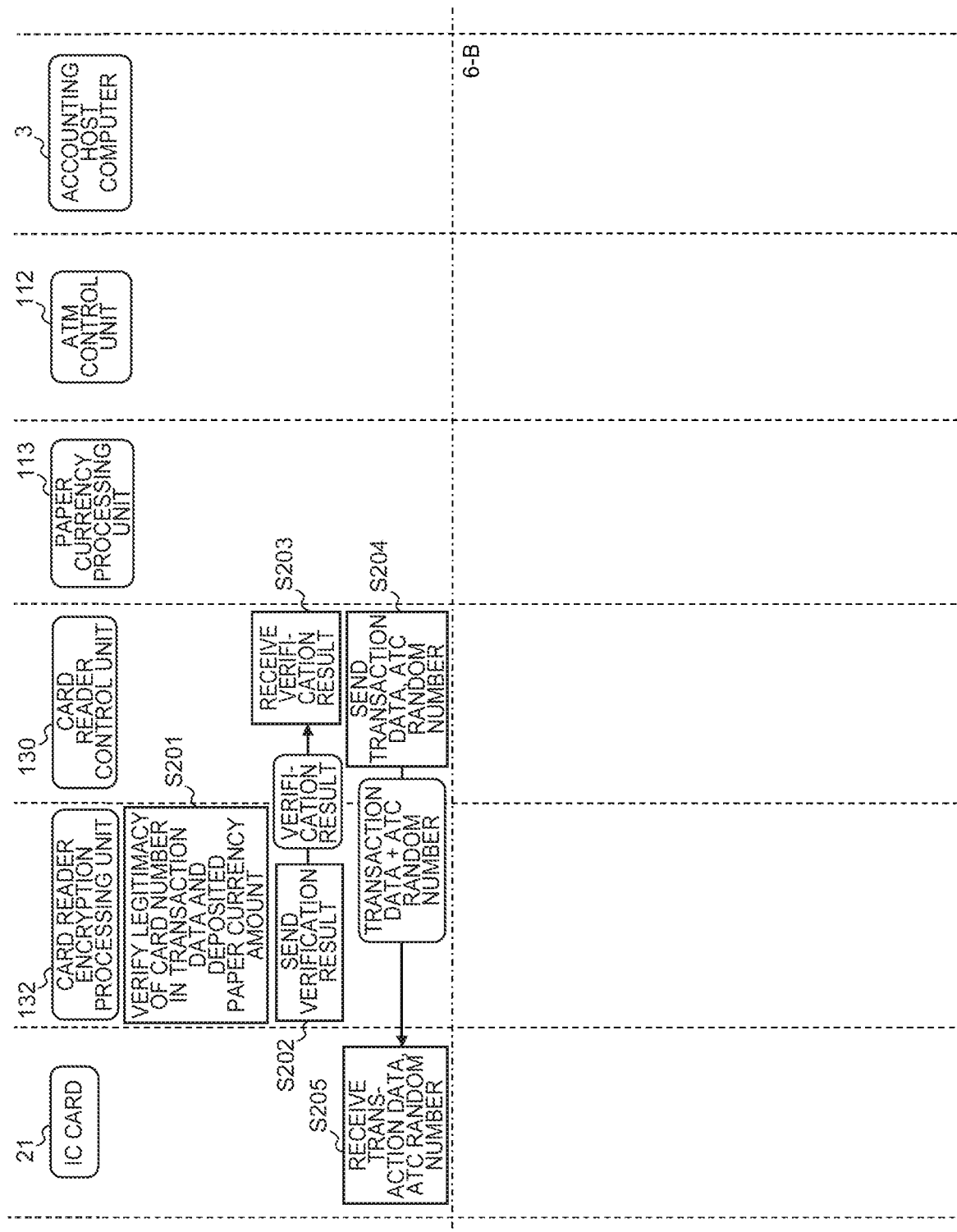

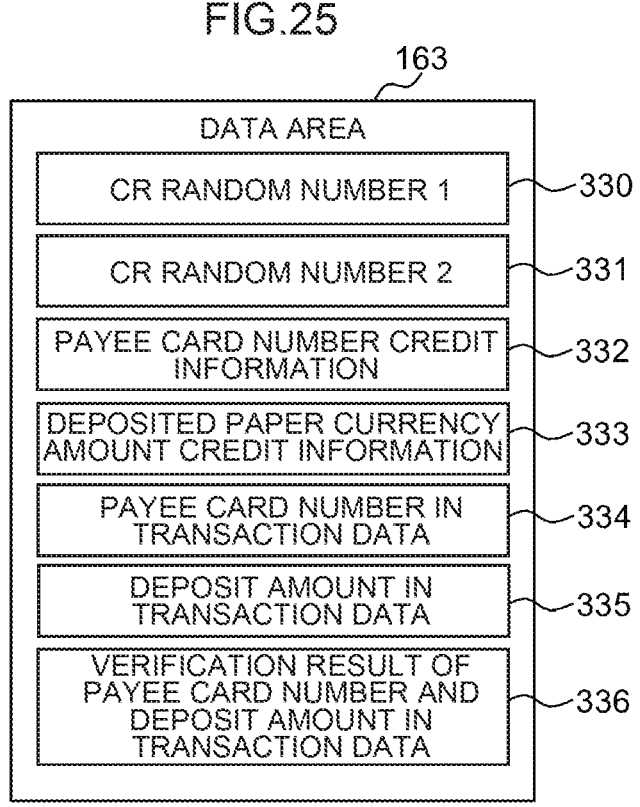

AUTOMATIC TRANSACTION DEVICE AND CONTROL METHOD THEREOF

TECHNICAL FIELD

The present invention relates to an automatic transaction device and a control method thereof and, for example, can be suitably applied to an ATM (Automated Teller Machine) which performs withdraw transactions and deposit transactions based on information recorded on credit cards and cash cards and operations of users.

BACKGROUND ART

Conventionally, with an automatic transaction device such as an ATM, there were cases where unauthorized processing of an unconfirmed transaction would be executed as a result of an unauthorized command being sent to an internal device. For example, there were cases where an unauthorized withdraw command, which is unrelated to the transaction, is sent to a paper currency processing unit within the automatic transaction device which performs the deposit/withdraw of paper currency, and cash is consequently paid out. As measures for preventing this kind of unauthorized processing, for instance, adopted are a method of encrypting the communication between the overall control unit which governs the control of the overall automatic transaction device and the internal device, and a method of detecting the falsification of a command or a response from an internal device by using a message authentication code.

Meanwhile, there are cases where it is insufficient even when the communication between the overall control unit and the internal device of the automatic transaction device is encrypted or when the message authentication code is used for protection. For example, the overall control unit is loaded with application software or control software for controlling the paper currency processing unit, but if such software is taken over by malware, there is a possibility that an unauthorized withdraw command will be sent to the paper currency processing unit even when the communication between the overall control unit and the internal device of the automatic transaction device is encrypted or when the message authentication code is used for protection. Furthermore, in the case of a deposit transaction, malware can also be used to increase the deposit amount to be greater than the actual denomination of the paper currency placed in the automatic transaction device and thereby fraudulently increase the account balance.

As a means for resolving the foregoing problems, for instance, PTL 1 describes providing a secure domain in the automatic transaction device, whereby such secure domain verifies the inconsistency of the software.

CITATION LIST

Patent Literature

[PTL 1] Specification of U.S. Patent Application Publication No. 2013/0036467

SUMMARY OF THE INVENTION

Problems to Be Solved By the Invention

However, when using the technology disclosed in PTL 1, it is necessary to register update software in the secure domain upon updating the application software or the control software. Here, if the update procedures are not performed properly, there is a risk of registering the update software in the secure domain in a state where malware has been included in the update software in advance.

The present invention was deviced in view of the foregoing points, and an object of this invention is to propose a highly reliable automatic transaction device and a control method thereof in which unauthorized processing will not be performed even when the application software or the control software has been fraudulently falsified with malware or the like.

Means to Solve the Problems

In order to achieve the foregoing object, the present invention provides an automatic transaction device comprising a main body control unit which generates first withdraw transaction data including amount information as information related to an amount in a withdraw transaction and a withdraw command for instructing a withdraw of a paper currency based on the first withdraw transaction data, a paper currency processing unit which receives the withdraw command and pays out the paper currency, and a first device which is a device that is different from the paper currency processing unit and which determines a feasibility of a withdraw based on the first withdraw transaction data sent from the main body control unit, wherein, when the first device determines that the withdraw is possible, the first device generates withdraw credit information with security that is higher than the withdraw command based on the first withdraw transaction data, and wherein the paper currency processing unit receives the withdraw credit information and the withdraw command, additionally determines the feasibility of the withdraw based on the withdraw credit information and the withdraw command, and pays out the paper currency when the withdraw is possible.

Furthermore, the present invention additionally provides a control method of an automatic transaction device comprising a main body control unit which generates first withdraw transaction data including amount information as information related to an amount in a withdraw transaction and a withdraw command for instructing a withdraw of a paper currency based on the first withdraw transaction data, a paper currency processing unit which receives the withdraw command and pays out the paper currency, and a first device which is a device that is different from the paper currency processing unit and which determines a feasibility of a withdraw based on the first withdraw transaction data sent from the main body control unit, wherein the control method comprises: a first step of generating, when the first device determines that the withdraw is possible, withdraw credit information with security that is higher than the withdraw command based on the first withdraw transaction data; and a second step of the paper currency processing unit receiving the withdraw credit information and the withdraw command, additionally determining the feasibility of the withdraw based on the withdraw credit information and the withdraw command, and paying out the paper currency when the withdraw is possible.

According to the automatic transaction device and its control method of the present invention, even when an unauthorized withdraw command of an unconfirmed transaction is sent from the main body control unit to the paper currency processing unit as a result of the application loaded in the main body control unit being infected with malware, because the withdraw amount instructed in the withdraw command and the amount information included in the withdraw credit information provided from the first device to the paper currency processing unit will be contradictory (will not match), the paper currency processing unit will not perform the withdraw processing based on the withdraw command.

Advantageous Effects of the Invention

According to the present invention, it is possible to realize a highly reliable automatic transaction device and a control method thereof.

BRIEF DESCRIPTION OF DRAWINGS

FIG. 7 is a block diagram showing a schematic configuration of an automatic transaction system according to the first to fifth embodiments.

FIG. 21B is a flowchart showing a flow of the ATM withdraw transaction processing in the third embodiment.

FIG. 22 is a block diagram showing a data configuration of a card reader encryption processing unit in the fourth embodiment.

FIG. 24B is a flowchart showing a flow of the ATM deposit transaction processing in the fourth embodiment.

FIG. 25 is a block diagram showing a data configuration of a card reader encryption processing unit in the fifth embodiment.

DESCRIPTION OF EMBODIMENTS

An embodiment of the present invention is now explained in detail with reference to the appended drawings.

(1) First Embodiment (1-1) Configuration of Conventional Automatic Transaction System Before explaining the automatic transaction system according to this embodiment, the configuration of a conventional automatic transaction system is foremost explained.

Figure 1:
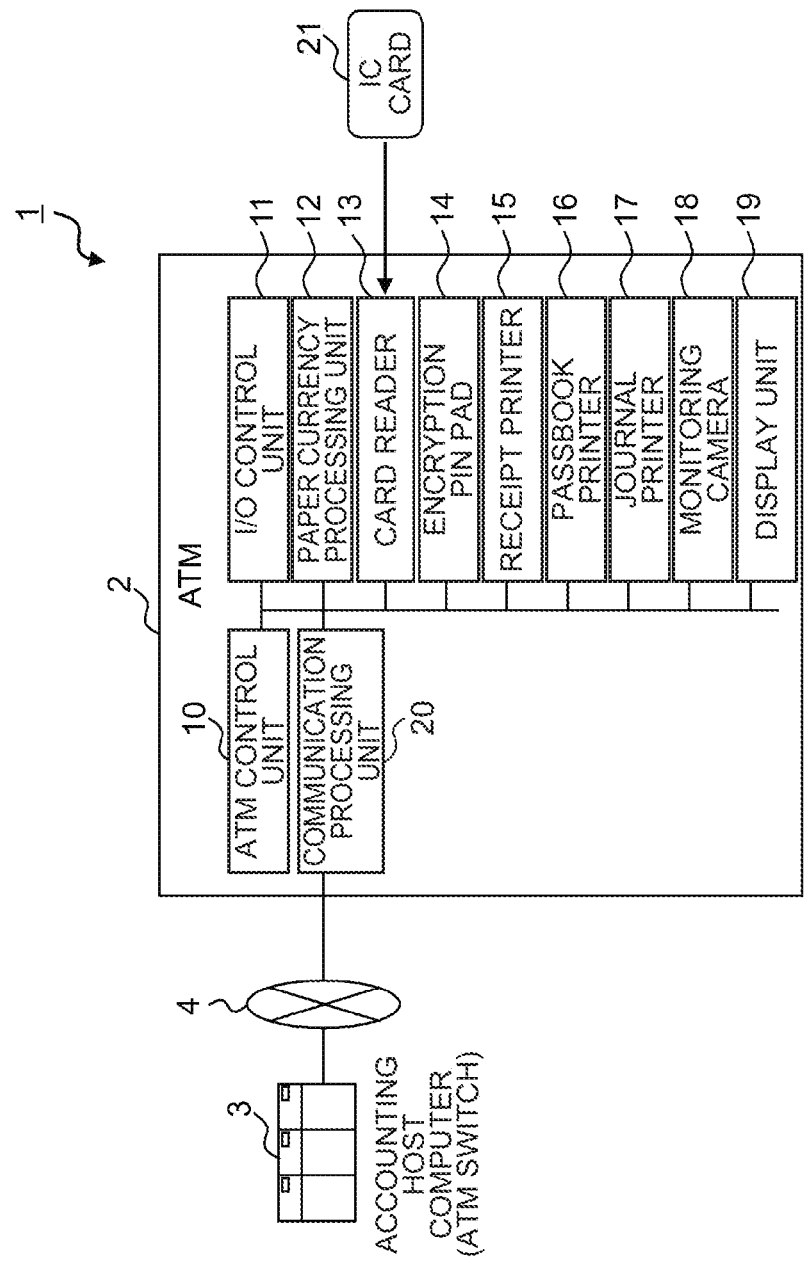
FIG. 1 is a block diagram showing a schematic configuration of a conventional automatic transaction system.

FIG. 1 is a diagram showing a configuration example of a conventional automatic transaction system. The automatic transaction system 1 is configured by one or more ATMs 2 and an accounting host computer 3 being connected via a wide area network 4 such as a LAN (Local Area Network) or a WAN (Wide Area Network).

The ATM 2 is an automatic transaction device which performs transactions of cash deposit/withdraw according to the user's operation. The ATM 2 is configured by comprising an ATM control unit 10 which governs the operational control of the overall ATM 2, an I/O control unit 11 which performs the display lamp control of the front panel of the ATM 2 and detects the opening/closing of the front panel, a paper currency processing unit 12 which counts the paper currencies deposited in a deposit/withdraw port provided at the front of the ATM 2 and transfers and stores the counted paper currencies to and in a cashbox, or removes the paper currencies to be paid out from the cashbox and transfers the removed paper currencies to the deposit/withdraw port, a card reader 13 which reads information recorded on a card medium, such as a cash card, from the card medium which is required for performing transactions in the ATM 2, an encryption pin pad 14 which includes a numeric keypad for inputting the personal identification number and other information and which encrypts the input personal identification number and other information, a receipt printer 15 which is a printer for printing transaction receipts, a passbook printer 16 which is a printer for printing on passbooks, a journal printer 17 which records the logs of the ATM transactions, a security monitoring camera 18 which takes a face photo of a user, a display unit 19 which displays information related to the deposit transaction, and a communication processing unit 20 which communicates with an accounting host computer 3. Note that the display unit 19 may also be a display operation unit which receives operations from the user.

However, the ATM 2 may also comprise a hard currency processing unit (not shown) for handling the hard currency that was deposited or the hard currency to be paid out. Moreover, as the first embodiment, explained is a case of using an IC card (Integrated Circuit Card) 21 as the card medium.

Figure 2:
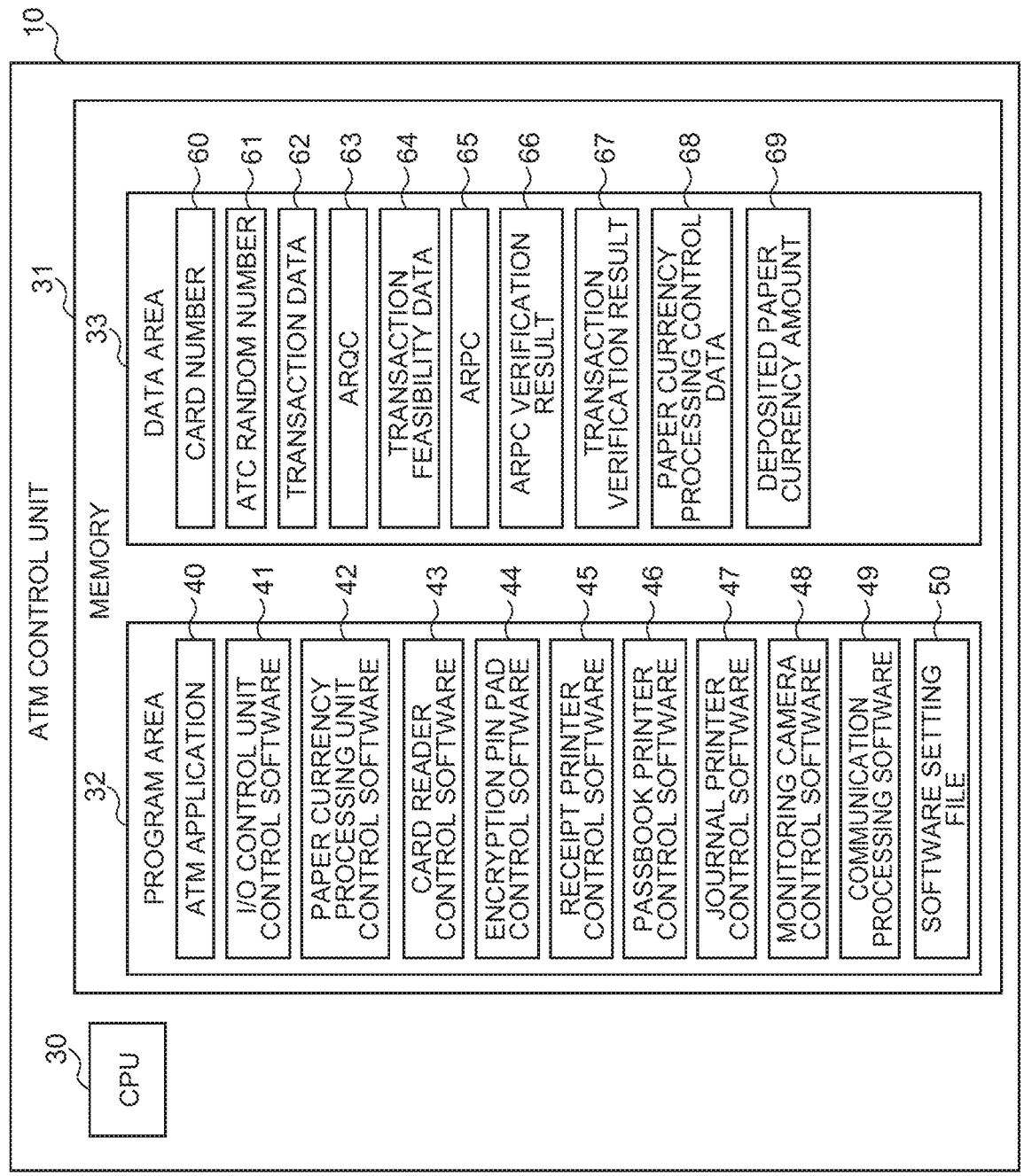
FIG. 2 is a block diagram showing a schematic configuration of a conventional ATM control unit.

FIG. 2 is a diagram showing a schematic configuration of the ATM control unit 10. As shown in FIG. 2, the ATM control unit 10 adopts a micro computer configuration comprising information processing resources such as a CPU (Central Processing Unit) 30 and a memory 31. The CPU 30 is a processor which governs the operational control of the overall ATM control unit 10, and the memory 31 is configured, for instance, from a semiconductor memory.

The storage area of the memory 31 of the ATM control unit 10 is managed by being divided into a program area 32 and a data area 33. The program area 32 stores an ATM application 40 which controls the overall transactions of the ATM 2, and software (I/O control unit control software 41, paper currency processing unit control software 42, card reader control software 43, encryption pin pad control software 44, receipt printer control software 45, passbook printer control software 46, journal printer control software 47, monitoring camera control software 48 and communication processing software 49) for respectively controlling the I/O (Input/Output) the control unit 11, the paper currency processing unit 12, the card reader 13, the encryption pin pad 14, the receipt printer 15, the passbook printer 16, the journal printer 17, the monitoring camera 18 and the display unit 19, and a software environment setup file 50.

Moreover, the data area 33 stores data required for performing the deposit/withdraw transaction in the ATM 2. Specifically, the data area 33 stores a card number 60, an ATC (ATm Controller) random number 61, transaction data 62, an ARQC (Authentication Request Cryptogram) 63, transaction feasibility data 64, an ARPC (Authentication Response Cryptogram) 65, an ARPC verification result 66, a transaction verification result 67, paper currency processing unit control data 68 and a deposited paper currency amount 69.

The card number 60 is information for identifying the user's account, such as the bank account number or the credit card number, which is stored in the IC card 21, and is acquired from the IC card 21 by the card reader 13 and stored in the memory 30 of the ATM control unit 10. The ATC random number 61 is a random number generated by the ATM control unit 10 to increase the security required for the exchange of transaction telegrams between the ATM 2 and the accounting host computer 3. This is in order to prevent a "replay attack" of engaging in an unauthorized transaction with a previously stored transaction telegram by seemingly changing the bit pattern of the telegram data which is generated for each transaction.

The transaction data 62 is transaction telegram data to be sent to the accounting host computer 3. The transaction data 62 includes, for example, information related to the transaction based on the user's input such as the withdraw amount or the deposit amount, in particular information related to the transaction amount. Moreover, the transaction data 62 may also include information such as the card number 60. The ARQC 63 is a message authentication code (MAC) of the transaction data 62 to be sent to the accounting host computer 3, and is generated by the IC card 21. The transaction feasibility data 64 is data indicating the result obtained by the accounting host computer 3 referring to the bank account balance and the credit information and determining whether the transaction, which is based on the transaction data 62 sent from the ATM 2, is feasible. The ARPC 65 is a message authentication code of the transaction feasibility data 64, and is generated by the accounting host computer 3. The accounting host computer 3 is also referred to as an ATM switch, an upper-level device of the ATM, or an external computer as a computer outside the ATM.

The ARPC verification result 66 is data indicating the result of verifying the message authentication code of the ARPC 65 in the IC card 21. The transaction verification result 67 is a message authentication code of the transaction data to be generated in the IC card 21, and "TC" is stored when the transaction is accepted and "AAC" is stored when the transaction is rejected. The paper currency processing unit control data 68 is command data for the paper currency processing to be sent by the ATM control unit 10 to the paper currency processing unit 12 (FIG. 1), and includes, for example, a paper currency withdraw command for instructing the withdraw of the paper currency, a paper currency number count command for instructing the counting of the deposited paper currency count, and a paper currency retention command for instructing the retention of the deposited paper currency. The deposited paper currency amount 69 is the total amount of the paper currencies deposited into the ATM 2 which were counted by the paper currency processing unit 12 during a deposit transaction.

Figure 3:
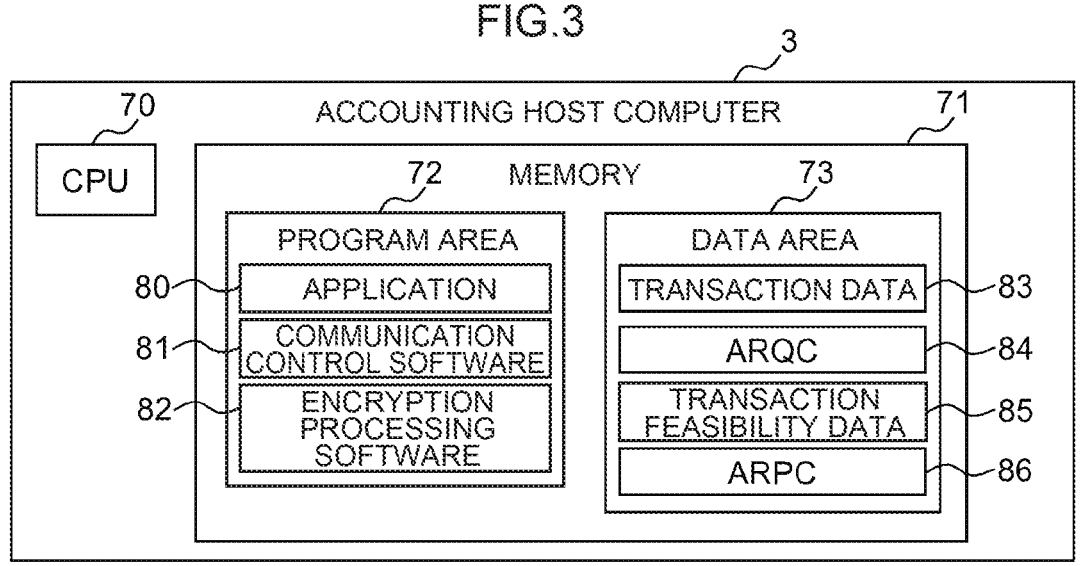
FIG. 3 is a block diagram showing a schematic configuration of an accounting host computer.

Meanwhile, the accounting host computer 3 is a computer device with a function of storing and managing information related to the account and balance of users of the ATM 2, and is configured by comprising, as shown in FIG. 3, information processing resources such as a CPU 70 which governs the operational control of the overall accounting host computer 3, and a memory 71.

The storage area of the memory 71 of the accounting host computer 3 is managed by being divided into a program area 72 and a data area 73, wherein the program area 72 stores an application 80, communication control software 81 and encryption processing software 82, and the data area 73 stores transaction data 83, an ARQC 84, transaction feasibility data 85 and an ARPC 86.

The application 80 is software which controls the overall accounting host computer 3. Moreover, the communication control software 81 is software with a function of controlling the data communication between the accounting host computer 3 and each ATM 2. The encryption processing software 82 is software with an encryption processing function of verifying the ARQC 84 as a message authentication code sent from the ATM 2, and generating a new message authentication code such as the ARPC 86.

Moreover, the transaction data 83 is transaction telegram data sent from the ATM 2 for use in withdraw transactions and deposit transactions, and is the same data as the transaction data 62 of FIG. 2. The ARQC 84 is a message authentication code for verifying that the transaction data 83 has not been falsified, and is generated by the IC card 21. The ARQC 84 is the same data as the ARQC 63 of FIG. 2. The transaction feasibility data 85 is data indicating the result obtained by the accounting host computer 3 referring to the bank account balance and the credit information and determining whether or not the transaction is feasible, and is the same data as the transaction feasibility data 64 of FIG. 2. The ARPC 86 is a message authentication code of the transaction feasibility data 85, and is generated by the accounting host computer 3. The ARPC 86 is also the same data as the ARPC 65 of FIG. 2.

Figure 4:
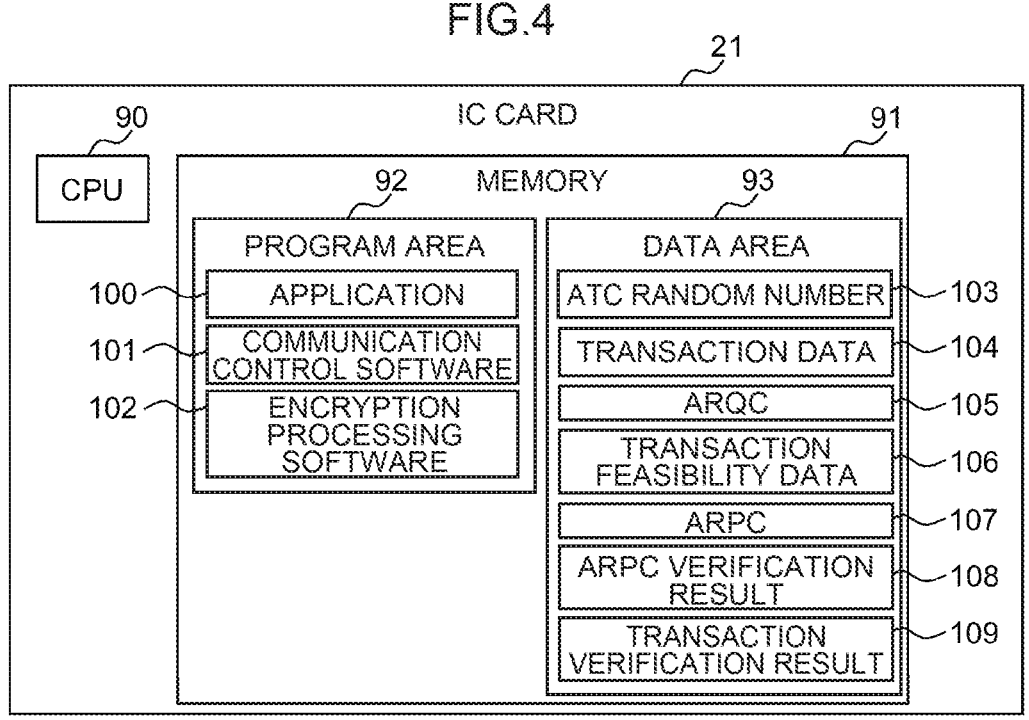
FIG. 4 is a block diagram showing a schematic configuration of an IC card.

FIG. 4 is a diagram showing a schematic configuration of the IC card 21. As evident from FIG. 4, the IC card 21 is configured by comprising information processing resources such as a CPU 90 which governs the operational control of the overall IC card 21, and a memory 91. The storage area of the memory 91 of the IC card 21 is managed by being divided into a program area 92 and a data area 93, wherein the program area 92 stores an application 100, communication control firmware 101 and encryption processing firmware 102, and the data area 93 stores an ATC random number 103, transaction data 104, an ARQC 105, transaction feasibility data 106, an ARPC 107, an ARPC verification result 108 and a transaction verification result 109.

The application 100 is software which controls the overall IC card 21. Moreover, the communication control firmware 101 is software with a function of controlling the data communication with the card reader 13 (FIG. 1). The encryption processing firmware 102 is software with an encryption processing function of generating the ARQC 105, and verifying the ARPC 107 sent from the accounting host computer 3.

Moreover, the ATC random number 103 is the same data as the ATC random number 61 (FIG. 2) generated in the ATM control unit 10 (FIG. 2), and was sent from the ATM control unit 10. The transaction data 104 is transaction telegram data sent from the ATM 10 for use in withdraw transactions or deposit transactions, and is the same data as the transaction data 83 of FIG. 3.

The ARQC 105 is the same data as the ARQC 63 of FIG. 2 and the ARQC 84 of FIG. 3, and is a message authentication code of the transaction data 62 of FIG. 2 which is generated from the ATC random number 103 and the transaction data 104. The ARQC 105 is verified by the accounting host computer 3. The transaction feasibility data 106 is data indicating the result obtained by the accounting host computer 3 referring to the bank account balance and the credit information and determining whether or not the transaction is feasible, and is the same data as the transaction feasibility data 64 of FIG. 2 and the transaction feasibility data 85 of FIG. 3.

The ARPC 107 is a message authentication code of the transaction feasibility data 106, is generated by the accounting host computer 3, and is the same data as the ARPC 65 of FIG. 2 and the ARPC 86 of FIG. 3. The transaction verification result 109 is data to be used for permitting a paper currency withdraw command to be sent to the paper currency withdraw command as a result of the IC card 21 verifying the ARPC 107. Moreover, the transaction verification result 109 is also used by the accounting host computer 3 to verify that the IC card 21 has verified the ARPC 349 and approved the transaction to be conducted in the ATM 2. As the transaction verification result 109, "TC" is generated when the transaction has been approved, and "AAC" is generated when the transaction has been rejected.

The IC card 21 stores the bank account number and the credit card number of the owner of the IC card 21 or information for use in personal identification, and is also equipped with a function for generating and verifying a message authentication code required for performing the ATM transaction with the accounting host computer 3.

The flow of the withdraw transaction processing performed in the conventional transaction system 1 is now explained with reference to FIG. 5. In the ensuing explanation, let it be assumed that the user of the ATM 2 has inserted the IC card 21 into the card reader 13 (FIG. 1), the ATM control unit 10 has received and stored the card number stored in the IC card via the card reader 13, the authentication of the IC card 21 and the personal identification authentication processing using a personal identification number or the like have been performed, and, furthermore, the ATM's encryption pin pad or display operation unit has received the withdraw amount in the withdraw transaction input by the user, the ATM control unit 10 has received the information of the withdraw amount, and stored the withdraw amount in the withdraw transaction. Moreover, let it also be assumed that the sharing of data, such as an encryption key required for the communication between the IC card 21 and the accounting host computer 3, required for the encryption processing has been completed.

Foremost, the ATM control unit 10 of the ATM 2 generates the ATC random number 61 (FIG. 2), and stores the generated ATC random number 61 in the memory 31 (FIG. 2) (S1). This is in order to prevent a "replay attack" of engaging in an unauthorized transaction with a previously stored transaction telegram by seemingly changing the bit pattern of the telegram data which is generated for each transaction. Next, the ATM control unit 10 generates the transaction data 62 (FIG. 2) required for the withdraw transaction (S2), and sends the ATC random number 61 generated in step S1 and the transaction data 62 generated in step S2 to the IC card 21 via the card reader 13 (S3).

When the IC card 21 receives the ATC random number 61 and the transaction data 62, the IC card 21 stores the received ATC random number 61 and transaction data 62 in the memory 91 (FIG. 4) (S4), generates the ARQC 105 as a message authentication code of the ATC random number 61 and the transaction data 62 (S5), and sends the generated ARQC 105 to the ATM control unit 10 (S6). When the ATM control unit 10 receives the ARQC 105 (S7), the ATM control unit 10 stores the received ARQC 105 as the ARQC 63 (FIG. 2) in the memory 31 (FIG. 2), and sends the ARQC 105, together with the transaction data 62 (FIG. 2), to the accounting host computer 3 (S8).

When the accounting host computer 3 receives the transaction data 62 and the ARQC 63 (S9), the accounting host computer 3 stores the received transaction data 62 and ARQC 63 respectively as the transaction data 83 (FIG. 3) and the ARQC 84 (FIG. 3) in the memory 71 (FIG. 3). Moreover, the accounting host computer 3 confirms the user's account balance and credit information, verifies the feasibility of the withdraw transaction based on the withdraw amount, the account balance or the credit information and thereby generates the transaction feasibility data 85 (FIG. 3), and additionally generates the ARPC 86 (FIG. 3) as the corresponding message authentication code (S10). Subsequently, the accounting host computer 3 returns the generated transaction feasibility data 85 and ARPC 86 to the ATM control unit 10 (S11).

Consequently, when the ATM control unit 10 receives the foregoing transaction feasibility data 85 and ARPC 86 returned from the accounting host computer 3 (S12), the ATM control unit 10 stores the received transaction feasibility data 85 and ARPC 86 respectively as the transaction feasibility data 64 (FIG. 2) and the ARPC 65 (FIG. 2) in the memory 31 (FIG. 2), and thereafter sends, to the IC card 21, the ARPC 65 and the transaction feasibility data which is required for ARPC verification (S13). Note that, in order to simplify the diagram, the description of the transaction feasibility data has been omitted in step S13 and step S14 of FIG. 5.

When the IC card 21 receives the ARPC 65 and the transaction feasibility data, the IC card 21 stores the received ARPC 65 and transaction feasibility data respectively as the ARPC 107 (FIG. 4) and the transaction feasibility data in the memory 91 (FIG. 4), verifies the legitimacy of the transaction feasibility data based on the ARPC, and stores the result as the ARPC verification result 108 (FIG. 4) in the memory 91 (S14). Moreover, the IC card 21 thereafter sends the ARPC verification result 108 to the ATM control unit 10 (S15).

When the ATM control unit 10 receives the ARPC verification result 108, the ATM control unit 10 stores the received ARPC verification result 108 as the ARPC verification result 66 (FIG. 2) in the memory 31 (FIG. 2) (S16). Moreover, the ATM control unit 10 refers to the content of the ARPC verification result 66 and, upon determining that the transaction has been accepted, once again generates the transaction data 62 (FIG. 2) which matches the request of the IC card 21, and sends the generated transaction data 62 (FIG. 2) to the IC card 21 (S17).

When the IC card 21 receives the transaction data 62 (S18), the IC card 21 stores the received transaction data 62 as the transaction verification result 67 (FIG. 2) in the memory 31 (FIG. 2) (S20). The IC card 21 generates the transaction verification result 109 (FIG. 4) as the message authentication code of the verification result, and sends the generated transaction verification result 109 to the ATM control unit 10 via the card reader 13 (S19).

When the ATM control unit 10 receives the transaction verification result 109, the ATM control unit 10 stores the received transaction verification result 109 as the transaction verification result 67 (FIG. 2) in the memory 31 (FIG. 2) (S20). When the value of the transaction verification result 67 is "AAC", the ATM control unit 10 displays a message on the display unit 19 (FIG. 1) of the ATM 2 to the effect that the transaction is not possible.

Meanwhile, when the value of the transaction verification result 67 is "TC", the ATM control unit 10 determines that the transaction has been accepted and generates a paper currency withdraw command including information regarding the paper currency denomination (thousand-yen bill, two thousand-yen bill, five thousand-yen bill and/or ten thousand yen-bill) and the number of such paper currencies to be paid out, stores the generated paper currency withdraw command as the paper currency processing unit control data 68 (FIG. 2) in the memory 31 (FIG. 2) (S21), and additionally sends the paper currency withdraw command to the paper currency processing unit 12 (S22).

When the paper currency processing unit 12 receives the paper currency withdraw command (S23), the paper currency processing unit 12 performs, based on the received paper currency withdraw command, the withdraw processing of removing the designated number of paper currencies of the denomination designated in the paper currency withdraw command from a cashbox storing the paper currencies which is enclosed with a vault provided within the ATM 2 and transferring the removed paper currencies to the deposit/withdraw port provided at the front of the ATM 2 (S24). In other words, the paper currency processing unit 12 performs the withdraw processing based on the paper currency withdraw command. This ends the flow of the conventional ATM withdraw transaction processing.

Here, a case where the ATM application 40 (FIG. 2) of the ATM control unit 10 is infected by malware and the processing of an unauthorized paper currency withdraw command of an unconfirmed transaction being sent to the paper currency processing unit 12 may occur in step S21 and step S22. In other words, the flow of the natural processing is for the ATM control unit 10 to generate a paper currency withdraw command based on the transaction verification result 67 (FIG. 2) stored in the memory 31 (FIG. 2). And this is guaranteed by the legitimacy of the ATM application 40.

Nevertheless, if the foregoing legitimacy is not ensured due to the infection of malware, an unauthorized paper currency withdraw command will be sent to the paper currency processing unit 12 without being based on the transaction verification result 67. In the foregoing case, the withdraw amount in the paper currency withdraw command may be falsified, or a paper currency withdraw command that is totally unrelated to the transaction may be sent to the paper currency processing unit 12, and the unauthorized withdraw of paper currency will occur.

Meanwhile, in the case of a deposit transaction, in addition to the fraudulent falsification of the deposit amount, there is a risk of fraudulent falsification of the deposit destination account number. In order to explain the foregoing risk, the flow of the conventional ATM deposit transaction processing is now explained with reference to FIG. 6A and FIG. 6B.

Figure 6A:
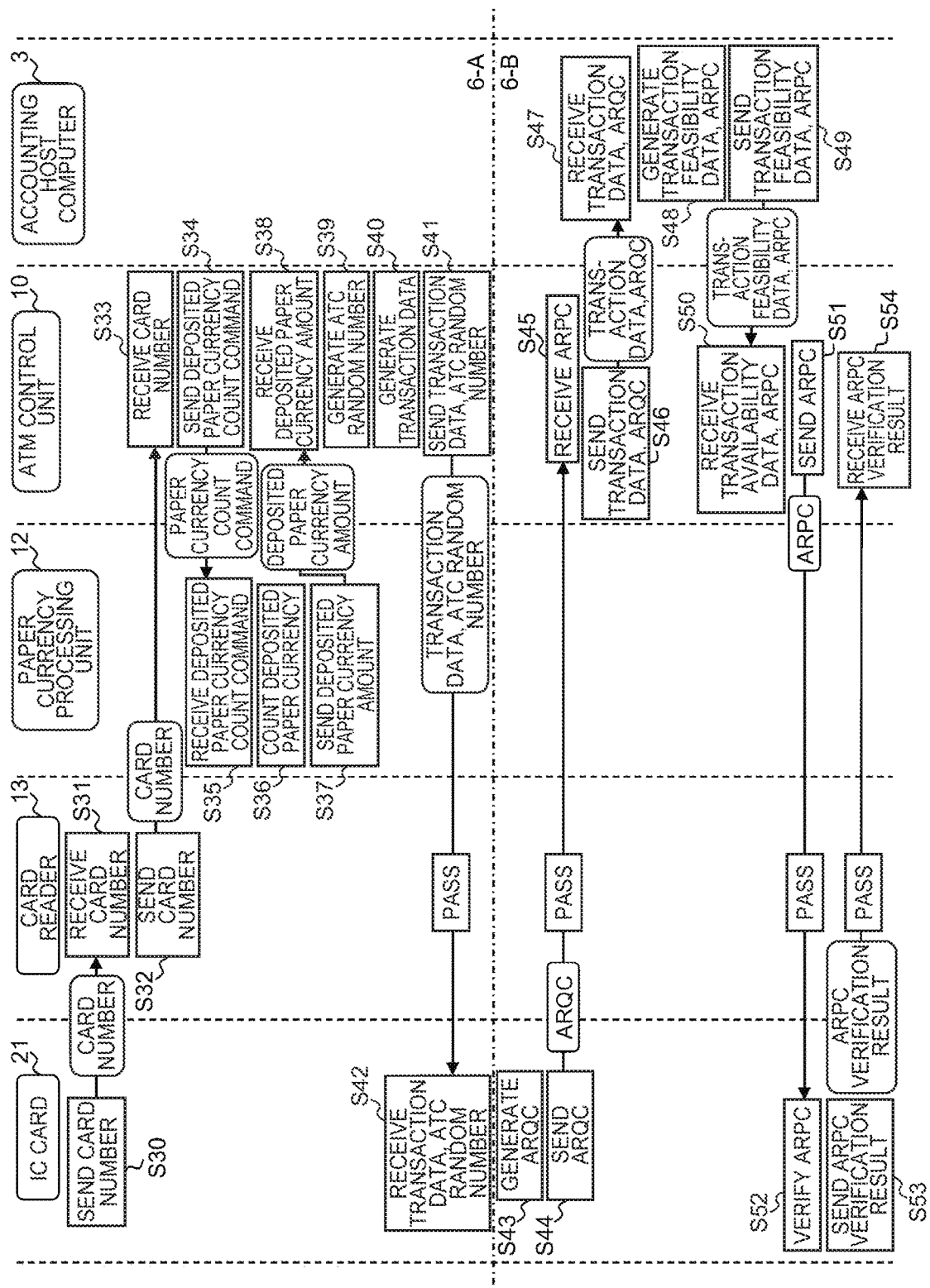
FIG. 6A is a flowchart showing a flow of the ATM deposit transaction processing in a conventional automatic transaction system.
Figure 6B:
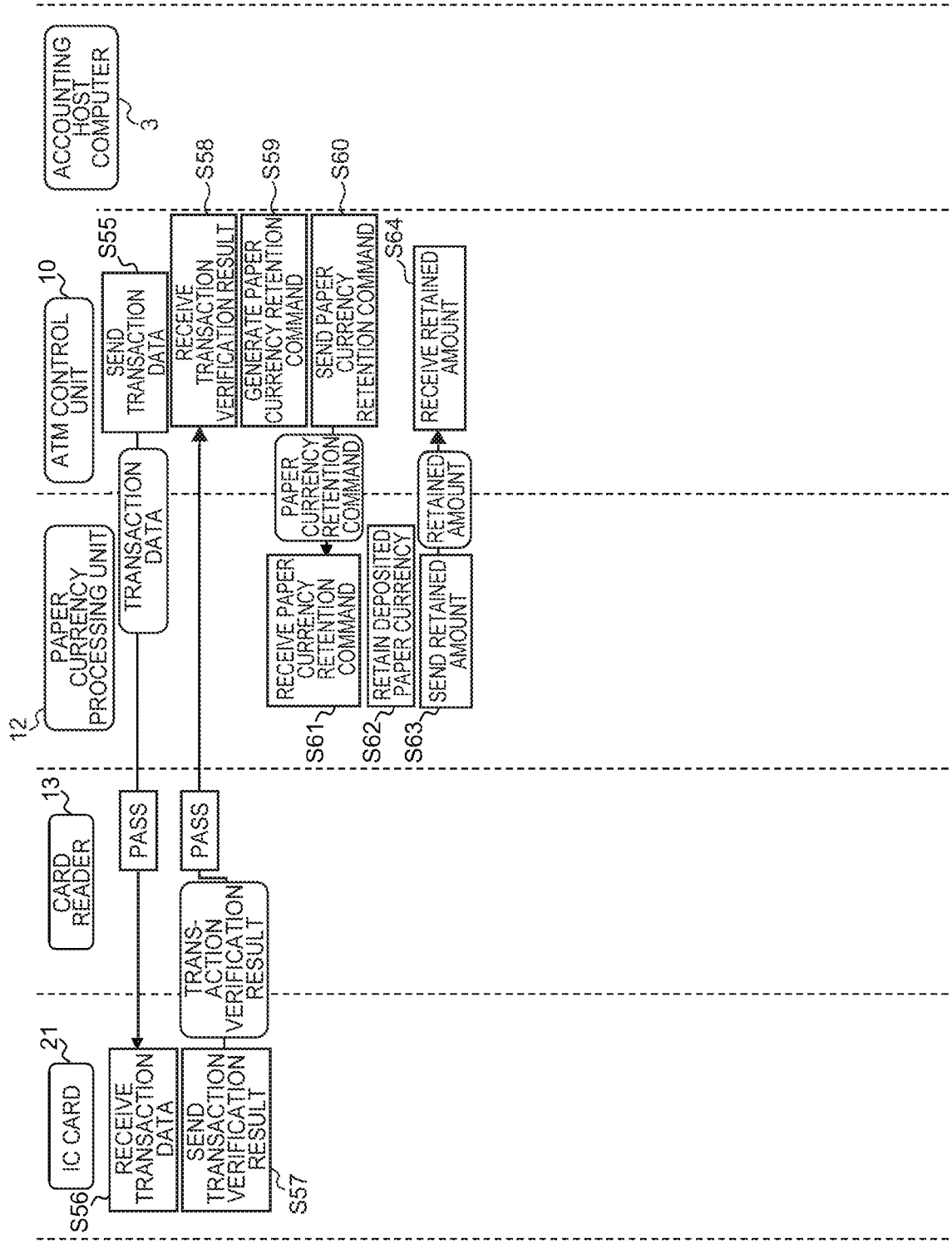
FIG. 6B is a flowchart showing a flow of the ATM deposit transaction processing in a conventional automatic transaction system.

FIG. 6A and FIG. 6B show the flow of the transaction processing of step S30 to step S33 related to the card number because it is necessary to increase the account balance upon performing a deposit transaction, but this processing also exists in a withdraw transaction. Because the flow of processing that is unique to a deposit transaction corresponds to step S34 to step S38 of FIG. 6A and step S58 to step S62 of FIG. 6B, the flow of such processing is now mainly explained.

When the internally stored card number is read by the IC card 21 and sent to the card reader (S30), the card reader 13 receives the read card number (S31), and additionally sends the card number as is to the ATM control unit 10 (S32). When the ATM control unit 10 receives the card number from the IC card 21 (S33), the ATM control unit 10 generates a deposited paper currency count command based on the paper currency processing unit control software 42 (FIG. 2) in order to count the total amount of the paper currencies deposited in the ATM 2, and sends the generated deposited paper currency count command to the paper currency processing unit 12 (S34). When the paper currency processing unit 12 receives the deposited paper currency count command (S35), the paper currency processing unit 12 counts the paper currencies deposited in the foregoing deposit/withdraw port provided at the front of the ATM 2, and stores the counted paper currencies in a temporary stacker within the paper currency processing unit (S36). Subsequently, the paper currency processing unit 12 sends the total amount of the counted paper currencies or the number of paper currencies of each denomination, as the deposited paper currency amount, to the ATM control unit 10 (S37). Note that a temporary stacker is a cashbox for temporarily retaining the paper currencies undergoing the transaction, and is also referred to as a temporary cashbox, and may or may not be enclosed with a vault.

When the ATM control unit 10 receives the deposited paper currency amount, the ATM control unit 10 stores the received deposited paper currency amount as the deposited paper currency amount 69 (FIG. 2) in the memory 31 (FIG. 2). Otherwise, when the ATM control unit 10 receives the number of paper currencies of each denomination, the ATM control unit 10 calculates the total amount and stores the calculated total amount in the memory 31 (FIG. 2) (S38). Subsequently, in the ATM control unit 10, the ATM application 40 (FIG. 2) generates the ATC random number 61 (FIG. 2) which is required to generate the ARQC (S39), and generates the transaction data 62 (FIG. 2) by using the deposited paper currency amount 69 stored in the memory 31 (S40). Subsequently, the ATM control unit 10 sends the generated ATM random number 61 and transaction data 62 to the IC card 21 via the card reader 13 (FIG. 1) (S41).

Figure 5:
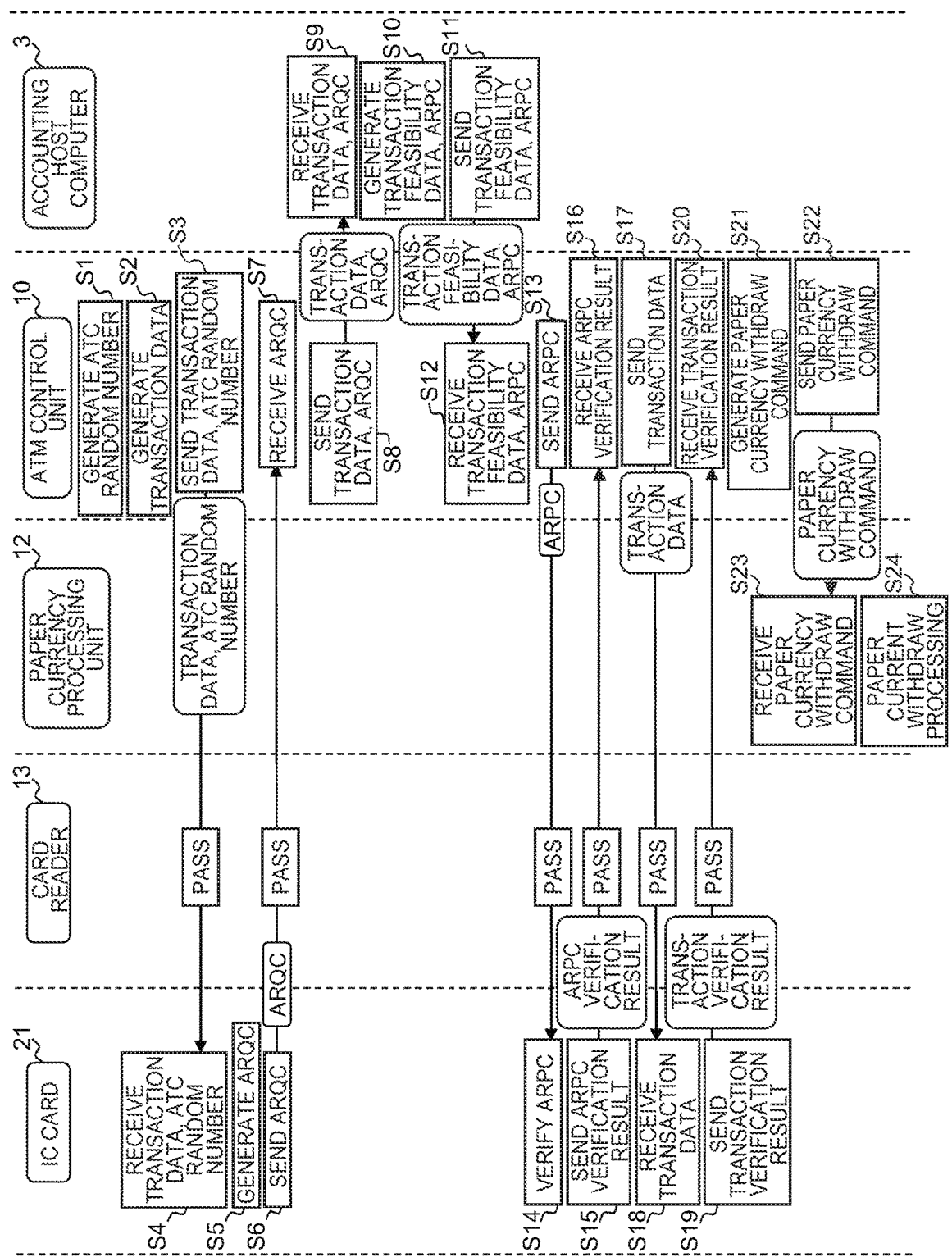
FIG. 5 is a flowchart showing a flow of the ATM withdraw transaction processing in a conventional automatic transaction system.

Consequently, when the IC card 21 receives the ATM random number 61 and the transaction data 62 (S42), the processing of step S43 to step S58 is thereafter performed based on the ATM random number 61 and the transaction data 62 in the same manner as step S5 to step S20 of FIG. 5. Note that the IC card 21 may also verify the legitimacy of the transaction data in step S57 based on the amount of the transaction data or the number of paper currencies of each denomination of the transaction data. Moreover, as with FIG. 5, the description of the transaction feasibility data of step S51 to step S52 has been omitted in FIG. 6A. Note that, in step S58, when the transaction verification result sent from the IC card 21 is "TC", the ATM control unit 10 generates a paper currency retention command and stores the generated paper currency retention command as the paper currency processing unit control data 68 (FIG. 2) in the memory 31 (FIG. 2) (S59). Moreover, when the foregoing transaction verification result is "AAC", the ATM control unit 10 determines that the transaction is not possible, and displays a message to such effect on the display unit 19 (FIG. 1) of the ATM 2.

Meanwhile, when the transaction verification result sent from the IC card 21 is "TC", the ATM control unit 10 sends the paper currency retention command generated as described above to the (S60). When the paper currency processing unit 12 receives the paper currency retention command (S61), the paper currency processing unit 12 performs the deposited paper currencies retention processing of transferring the paper currencies stored in the temporary stacker to the cashbox as described above (S62). This ends the flow of the conventional ATM deposit transaction processing.

Here, when the ATM application 40 (FIG. 2) is infected with malware, in the foregoing conventional ATM deposit transaction processing, there is a possibility that, upon generating the transaction data 62 in step S40, the transaction data 62 may be generated based on an amount that is greater than the deposited paper currency amount that was notified from the paper currency processing unit 12 to the ATM control unit 10 in step S37. In an extreme case, even if no paper currency has been deposited in the ATM 2, it is possible to cause the ATM control unit 10 to generate the transaction data 62 for a deposit transaction in step S40.

Accordingly, with the conventional transaction system 1, unless the legitimacy of the ATM application 40 is guaranteed, the paper currency withdraw processing of an unconfirmed transaction, or the deposit transaction of unconfirmed paper currencies, may become possible. Moreover, in the case of a deposit transaction, there is a possibility that an unauthorized transaction of depositing monies to an account other than the designated account may occur.

As security software for preventing the fraudulent falsification of the ATM application 40, the nine types of device control software shown in FIG. 2 (I/O control unit control software 41, paper currency processing unit control software 42, card reader control software 43, encryption pin pad control software 44, receipt printer control software 45, passbook printer control software 46, journal printer control software 47, monitoring camera control software 48 and communication processing software 49), and the software environment setup file 50, virus check software for detecting the intrusion of viruses and so-called white-list security software for preventing the activation of software other than the registered software have been conventionally known. Nevertheless, there are cases where the overall control unit (ATM control unit 10) is illegally modified so that the activation of such security software is prevented from functioning when the overall control unit (ATM control unit 10) is activated, and the foregoing security software is not versatile.

Thus, in this embodiment, proposed is an automatic transaction system in which unauthorized processing cannot be performed, even when the application software or the control software is fraudulently falsified with malware, based on safe inter-device communication between the internal devices of the ATM 2. The automatic transaction system of this embodiment is now explained with reference to FIG. 7 to FIG. 15.

(1-2) Configuration of Transaction System According to First Embodiment

In FIG. 7, in which the components corresponding to those of FIG. 1 are given the same reference numeral, reference numeral 110 represents the overall automatic transaction system according to this embodiment. The automatic transaction system 110 is configured in the same manner as the conventional automatic transaction system 1 described above with reference to FIG. 1 to FIG. 6B excluding the point that the functions of the ATM control unit 112, the paper currency processing unit 113 and the card reader 114 of the ATM 111 are different.

Figure 8:
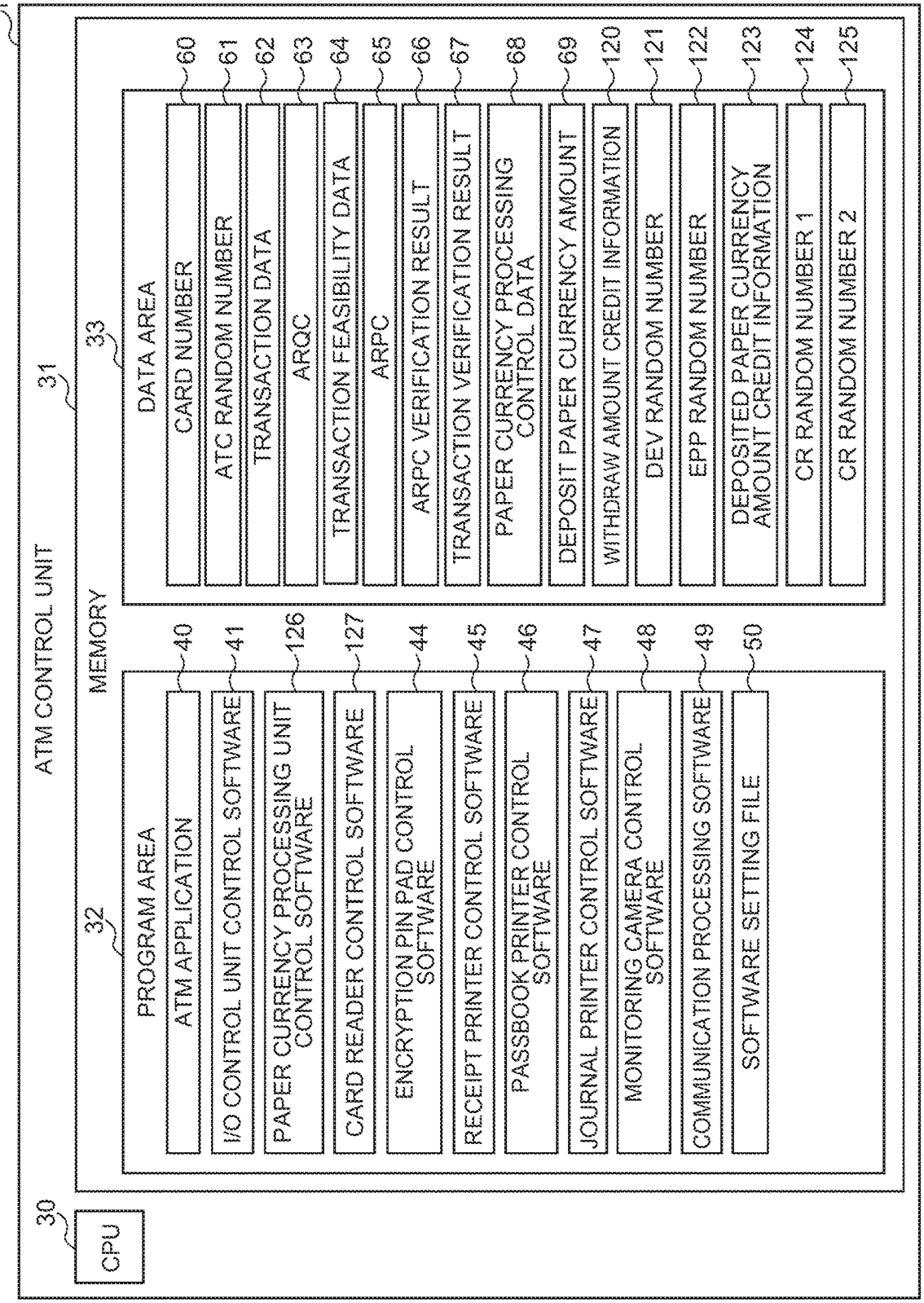
FIG. 8 is a block diagram showing a schematic configuration of an ATM unit according to the first to fifth embodiments.

FIG. 8, in which the components corresponding to those of FIG. 2 are given the same reference numeral, shows the configuration of the ATM control unit 112 of the ATM 111 according to this embodiment. The ATM control unit 112 is configured in the same manner as the conventional ATM control unit 10 described above with reference to FIG. 1 to FIG. 6B excluding the point that the data area 33 of the memory 31 stores withdraw amount credit information 120, a DEV random number 121, an EPP random number 122, deposited paper currency amount credit information 123, a first CR random number 124 and a second CR random number 125 in addition to the card number 60, the ATC random number 61, the transaction data 62, the ARQC 63, the transaction feasibility data 64, the ARPC 65, the ARPC verification result 66, the transaction verification result 67, the paper currency processing unit control data 68 and the deposited paper currency amount 69, and the point that the functions of the paper currency processing unit control software 126 and the card reader control software 127 stored in the program area 32 of the memory 31 are consequently different.

The withdraw amount credit information 120 is electronic signature data including information (amount information) of the amount that may be paid out by the paper currency processing unit 113, or a message authentication code (MAC). The withdraw amount credit information 120 may be information with security that is higher than the withdraw command. The withdraw amount credit information 120 is generated by the card reader encryption processing unit 132 (FIG. 9) described later based on the transaction verification result 67 output from the IC card 21, and sent to the paper currency processing unit 113 via the ATM control unit 112.

The DEV random number 121 is generated by the paper currency processing unit 113 and sent to the card reader encryption processing unit 132 (FIG. 9), and used for generating the withdraw amount credit information 120. The DEV random number 121 is used for preventing the replay attack of the withdraw amount credit information 120.

Figure 9:
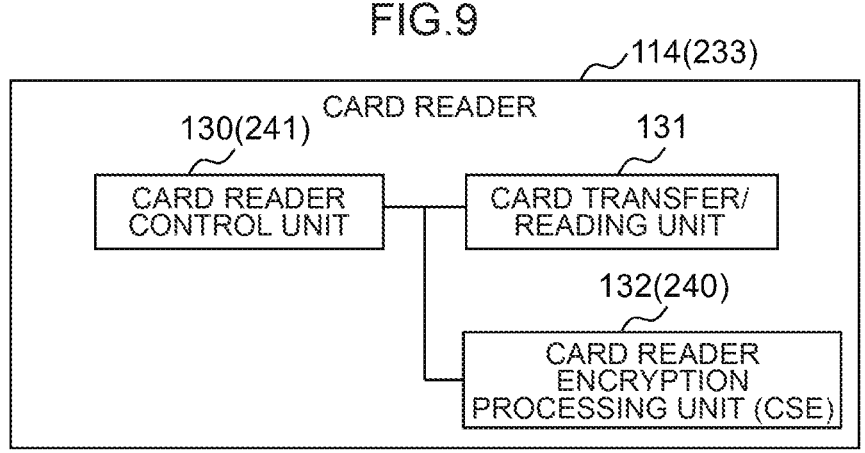
FIG. 9 is a block diagram showing a functional configuration of a card reader according to the first, second, fourth and fifth embodiments.

FIG. 9 is a diagram showing a configuration of the card reader 114 of this embodiment. The card reader 114 is configured by comprising a card reader control unit 130, a card transfer/reading unit 131 and a card reader encryption processing unit 132.

The card reader control unit 130 is a hardware unit with a function of controlling the card transfer/reading unit 131 and the card reader encryption processing unit 132, and exchanging data with the card transfer/reading unit 131 and the card reader encryption processing unit 132, and the card transfer/reading unit 131 is a hardware unit with a function of transferring the IC card 21 within the ATM 111, and inputting/outputting data to and from the IC card 21 through the contact point of the IC card 21. Moreover, the card reader encryption processing unit 132 is a hardware unit with a function of performing the encryption processing of generating and verifying the electronic signature data and the MAC within the card reader 114.

Figure 10:
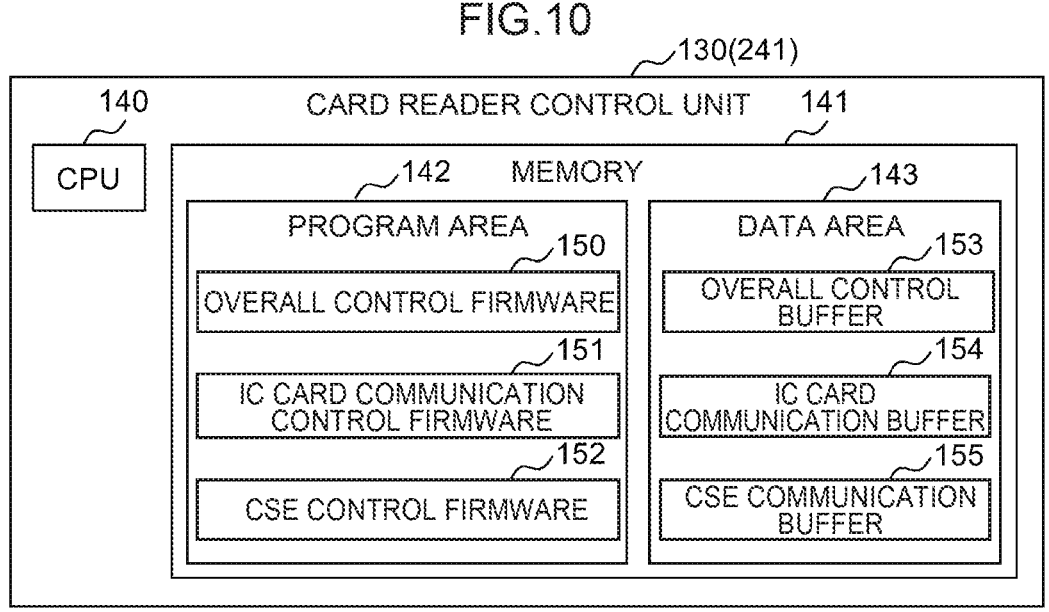
FIG. 10 is a block diagram showing a functional configuration of a card reader control unit according to the first, second, fourth and fifth embodiments.

The card reader control unit 130 is configured by comprising, as shown in FIG. 10, information processing resources such as a CPU 140 which governs the operational control of the overall card reader control unit 130, and a memory 141 which is configured from a semiconductor memory or the like.

The storage area of the memory 141 of the card reader control unit 130 is managed by being divided into a program area 142 and a data area 143, wherein the program area 142 stores overall control firmware 150, IC card communication control firmware 151 and CSE (Card reader Secure Element) control firmware 152, and the data area 143 stores an overall control buffer 153, an IC card communication buffer 154 and a CSE communication buffer 155.

The overall control firmware 150 is software with a function of controlling the communication with the ATM control unit 112 and performing the transfer control of the card transfer/reading unit 131 (FIG. 9), and the IC card communication control firmware 151 is software with a function of performing I/O control of data to and from the IC card 21. Moreover, the CSE control firmware 152 is software for controlling the card reader encryption processing unit 132 (FIG. 9) and performing communication control with the card reader encryption processing unit 132.

Moreover, the overall control buffer 153 is a data area to be used for the overall control including the communication buffer with the ATM control unit 112, and the IC card communication buffer 154 and the CSE communication buffer 155 are respectively communication control buffers with the IC card 21 or the card reader encryption processing unit 132.

Figure 11:
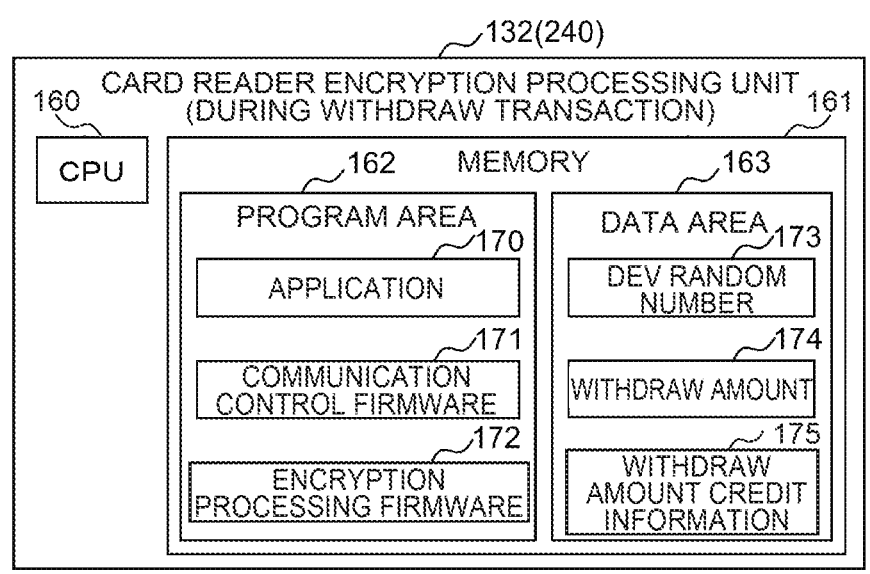
FIG. 11 is a block diagram showing a functional configuration of a card reader encryption processing unit according to the first, second, fourth and fifth embodiments.

FIG. 11 is a diagram showing a schematic configuration of the card reader encryption processing unit 132. The card reader encryption processing unit 132 is configured by comprising information processing resources such as a CPU 160 as a processor which governs the operational control of the overall card reader encryption processing unit 132, and a memory 161 configured from a semiconductor memory or the like.

The storage area of the memory 161 of the card reader encryption processing unit 132 is managed by being dividing into a program area 162 and a data area 163 in the same manner as the card reader control unit 130 (FIG. 10), wherein the program area 162 stores an application 170, communication control firmware 171 and encryption processing firmware 172, and the data area 163 stores a DEV random number 173, a withdraw amount 174 and withdraw amount credit information 175.

The application 170 is software with a function of performing the overall control of the card reader encryption processing unit 132, and the communication control firmware 171 is software with a function of performing communication control with the card reader control unit 130 (FIG. 10). Moreover, the encryption processing firmware 172 is software with a function of generating and verifying the electronic signature data and the MAC.

Moreover, the DEV random number 173 is a random number generated by the paper currency processing unit 113, and the withdraw amount 174 is a withdraw amount of the withdraw transaction that was established between the accounting host computer 3 and the IC card 21. Furthermore, the withdraw amount credit information 175 is electronic signature data or a MAC including the amount information regarding the amount that may be paid out by the paper currency processing unit 113. The withdraw amount credit information 175 is generated by the card reader encryption processing unit 132 based on the transaction verification result 109 (FIG. 4) output from the IC card 21. This data is the same data as the withdraw amount credit information 120 of FIG. 8.

Figure 12:
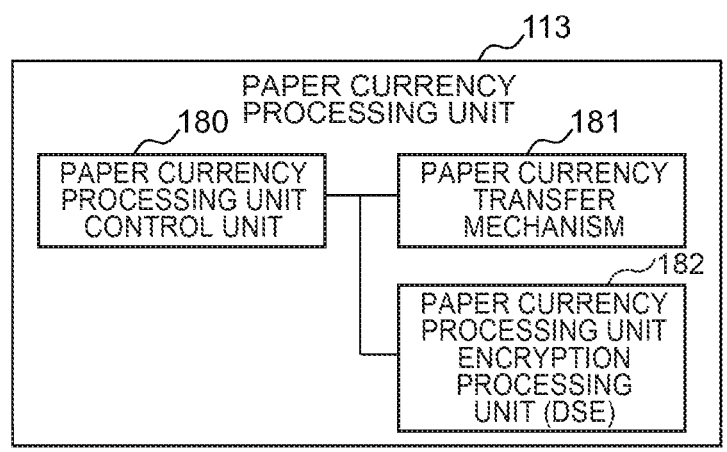
FIG. 12 is a block diagram showing a functional configuration of a paper currency processing unit according to the first to fifth embodiments.

FIG. 12 is a diagram showing a configuration of the paper currency processing unit 113. The paper currency processing unit 113 is configured by comprising a paper currency processing unit control unit 180, a paper currency transfer mechanism 181 and a paper currency processing unit encryption processing unit 182.

The paper currency processing unit control unit 180 is hardware with a function of controlling the paper currency transfer mechanism 181 and the paper currency processing unit encryption processing unit 182, and exchanging data with the paper currency transfer mechanism 181 and the paper currency processing unit encryption processing unit 182. Moreover, the paper currency transfer mechanism 181 is hardware with a function of transferring the paper currencies from the cashbox, which is storing the paper currencies in the vault, and paying out such paper currencies to the user of the ATM 111, and transferring the paper currencies deposited by the user in the paper currency deposit/withdraw port to the cashbox and accepting the deposit. Note that the paper currency processing control unit 180 may also have a function of counting the denomination and number of paper currencies transferred during the withdraw or deposit. The paper currency processing unit encryption processing unit 182 is a unit which is in charge of performing the encryption processing of generating and verifying the electronic signature data and the MAC within the paper currency processing unit 113.

Figure 13:
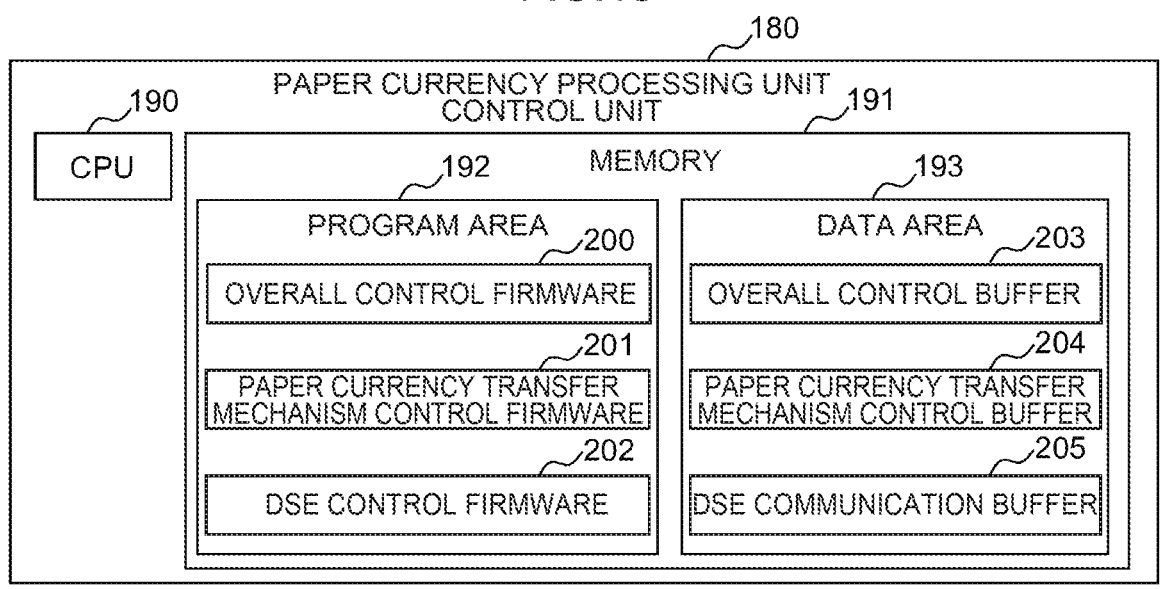
FIG. 13 is a block diagram showing a functional configuration of a paper currency processing unit control unit according to the first to fifth embodiments.

The paper currency processing unit control unit 180 is configured by comprising, as shown in FIG. 13, information processing resources such as a CPU 190 which governs the operational control of the overall paper currency processing unit control unit 180, and a memory 191 configured from a semiconductor memory or the like.

The storage area of the memory 191 of the paper currency processing unit control unit 180 is managed by being divided into a program area 192 and a data area 193, wherein the program area 192 stores overall control firmware 200, paper currency transfer mechanism control firmware 201 and DSE (Device Secure Element) control firmware 202, and the data area 193 stores an overall control buffer 203, a paper currency transfer mechanism control buffer 204 and a DSE communication buffer 205.

The overall control firmware 200 is software with a function of controlling the communication with the ATM control unit 112, and controlling the paper currency transfer mechanism control firmware 201 and the DSE control firmware 202. Moreover, the paper currency transfer mechanism control firmware 201 is software with a function of controlling the paper currency transfer mechanism 181 (FIG. 12). Furthermore, the DSE control firmware 202 is software with a function of controlling the paper currency processing unit encryption processing unit 182 (FIG. 12), and performing communication control with the paper currency processing unit encryption processing unit 182.

Moreover, the overall control buffer 203 is a data area that is used for controlling other control firmware in addition to functioning as a communication buffer with the ATM control unit 112. Moreover, the paper currency transfer mechanism control buffer 204 and the DSE communication buffer 205 are respectively communication buffers to be used during the communication with the paper currency transfer mechanism 181 or the paper currency processing unit encryption processing unit 182.

Figure 14:
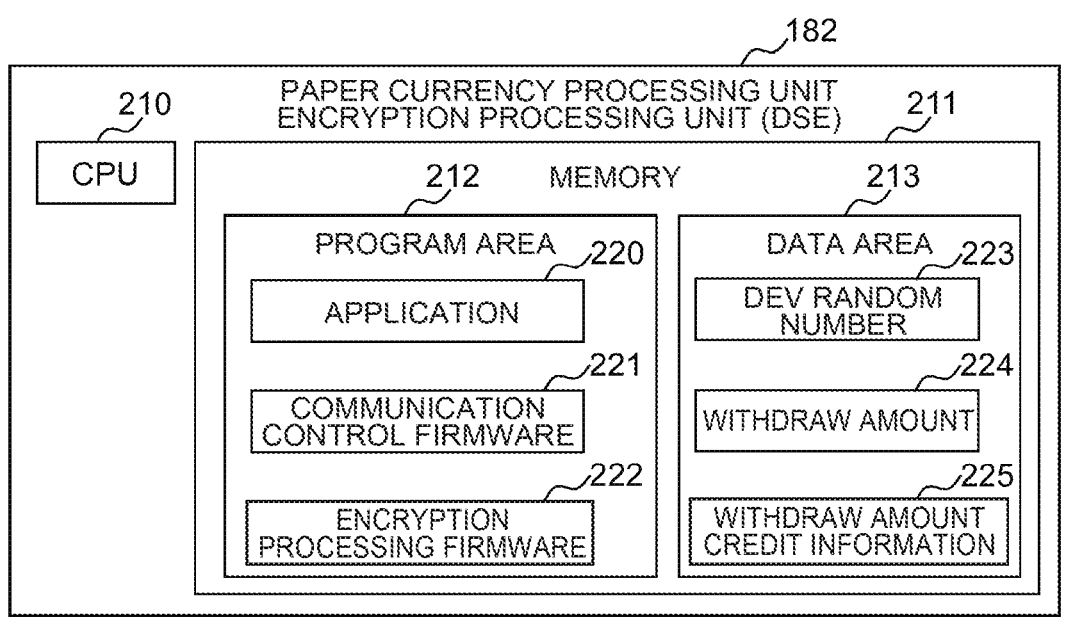
FIG. 14 is a block diagram showing a functional configuration of a paper currency processing unit encryption processing unit according to the first to fifth embodiments.

FIG. 14 is a diagram showing a schematic hardware configuration of the paper currency processing unit encryption processing unit 182 and a data configuration during a withdraw transaction. The paper currency processing unit encryption processing unit 182 is configured by comprising information processing resources such as a CPU 210 which governs the operational control of the overall paper currency processing unit encryption processing unit 182, and a memory 211 configured from a semiconductor memory or the like.

The storage area of the memory 211 of the paper currency processing unit encryption processing unit 182 is managed by being divided into a program area 212 and a data area 213 in the same manner as the paper currency processing unit control unit 180 (FIG. 13), wherein the program area 212 stores an application 220, communication control firmware 221 and encryption processing firmware 222, and the data area 213 stores a DEV random number 223, a withdraw amount 224 and withdraw amount credit information 225.

The application 220 is software with a function of performing the overall control of the paper currency processing unit encryption processing unit 182, and the communication control firmware 221 is software with a function of performing communication control with the paper currency processing unit control unit 180 (FIG. 13). Moreover, the encryption processing firmware 222 is software with a function of generating and verifying the electronic signature data and the MAC.

Moreover, the DEV random number 223 is a random number that is used upon generating the withdraw amount credit information 225, and is generated by the paper currency processing unit encryption processing unit 182. The withdraw amount 224 is a withdraw amount that is included in the paper currency withdraw command to be sent from the ATM control unit 112. In other words, because the paper currency withdraw command includes the paper currency denomination and the number of paper currencies corresponding to that denomination, the withdraw amount 224 is calculated by the paper currency processing control unit 180 based on the paper currency denomination×the cumulative amount of number of paper currencies. Furthermore, the withdraw amount credit information 225 is data that is generated by and sent from the card reader encryption processing unit 132 (FIG. 11), and is electronic signature data or a MAC including the amount information of the paper currency that may be paid out by the paper currency processing unit 113. This data is the same data as the withdraw amount credit information 120 of FIG. 8 and the withdraw amount credit information 175 of FIG. 11.

The flow of the ATM withdraw transaction processing performed in the automatic transaction system 110 of this embodiment is now explained with reference to FIG. 15.

Figure 15:
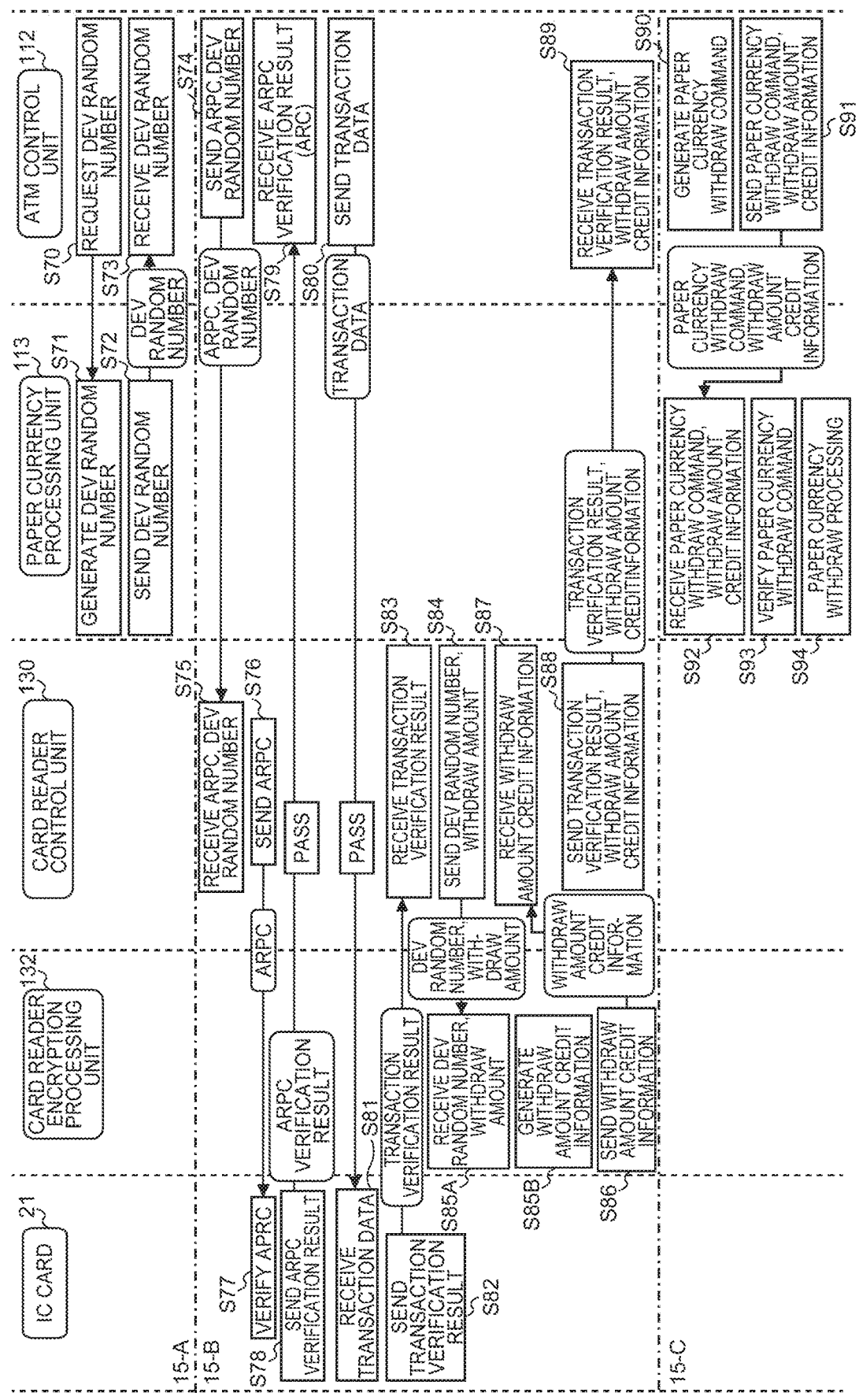
FIG. 15 is a flowchart showing a flow of the ATM withdraw transaction processing in the first embodiment.

Note that, because FIG. 15 shows processing that is performed subsequently to the processing of step S1 to step S12 of FIG. 5, the processing of step S1 to step S12 of FIG. 5 is omitted in order to clarify the features of the invention, and only the flow of the subsequent processing is shown. Here, as the premise, let it be assumed that the sharing of the encryption key and the generation of sessions required for the exchange of credit information with the card reader encryption processing unit 132 (FIG. 11) and the paper currency processing unit encryption processing unit 182 (FIG. 14) have already been completed. Moreover, as an additional premise, let it be assumed that, when the ATC random number 61 and the transaction data 62 are sent to the IC card 21 via the card reader 114 in step S3 of FIG. 5, the card reader control unit 130 (FIG. 10) of the card reader 1 will extract the withdraw amount included in the transaction data 62 and store the extracted withdraw amount in the overall control buffer 153 (FIG. 10). Note that the withdraw amount included in the transaction data 62 is the same as the withdraw amount which was input by the user and stored by the ATM control unit 112.

Foremost, the ATM control unit 112 sends a request for generating a DEV random number to the paper currency processing unit 113 (S70). When the paper currency processing unit 113 receives the foregoing request, the paper currency processing unit 113 generates the DEV random number in the paper currency processing unit encryption processing unit 182 (FIG. 14) (S71), and sends the generated DEV random number to the ATM control unit 112 (S72).

When the ATM control unit 112 receives the DEV random number (S73), the ATM control unit 112 sends the ARPC sent from the accounting host computer 3, the transaction feasibility data required for verification, and the received DEV random number, to the card reader control unit 130 (S74). Note that, in order to simplify the diagram, the description of the transaction feasibility data has been omitted in step S74 to step S77 of FIG. 15.

When the card reader control unit 130 receives the ARPC, the transaction feasibility data and the DEV random number (S75), the card reader control unit 130 sends the ARPC and the transaction feasibility data to the IC card 21 (S76), and temporarily stores the DEV random number in the overall control buffer 153 (FIG. 10). Moreover, when the IC card 21 receives the ARPC and the transaction feasibility data, the IC card 21 verifies the legitimacy of the transaction feasibility data based on the content of the ARPC (S77), and sends the ARPC verification result (ARC) to the ATM control unit 112 (S78).

When the ATM control unit 112 receives the ARPC verification result from the IC card 21 (S79), the ATM control unit 112 confirms the content of the ARPC verification result and, when the content is the approval of the transaction, generates new transaction data and sends the new transaction data to the IC card 21 (S80). When the IC card 21 receives the transaction data (S81), generates, as the transaction verification result, "TC" when the transaction may be established and "AAC" when the transaction is to be refused, and sends the generated transaction verification result to the card reader control unit 130 (S82).

When the card reader control unit 130 receives "TC" as the foregoing transaction verification result sent from the IC card 21 (S83), the card reader control unit 130 sends the withdraw amount stored in the overall control buffer 153 (FIG. 10) and the DEV random number received in step S75 to the card reader encryption processing unit 132 (S84). Here, the withdraw amount stored in the overall control buffer 153 (FIG. 10) is the withdraw amount that was extracted from the transaction data 62 and stored in the overall control buffer 153 by the card reader control unit 130 of the card reader 13 as described above upon the card reader 13 intermediating the transaction data 62 sent from the ATM control unit 112 to the IC card 21 in step S3 of FIG. 5. Otherwise, the withdraw amount may be stored in the data area 174 of the card reader encryption processing unit rather than being stored in the overall control buffer 153.

When the card reader encryption processing unit 132 receives the withdraw amount and the DEV random number (S85A), the card reader encryption processing unit 132 stores the DEV random number as the DEV random number 173 (FIG. 11) in the memory 161 (FIG. 11), stores the withdraw amount as the withdraw amount 174 (FIG. 11) in the memory 161, thereafter generates withdraw amount credit information by using the DEV random number, the withdraw amount and the encryption key that is shared with the paper currency processing unit encryption processing unit 182 (FIG. 14) (S85B), and sends the generated withdraw amount credit information to the card reader control unit 130 (S86).

Moreover, when the card reader control unit 130 receives the withdraw amount credit information (S87), the card reader control unit 130 sends the transaction verification result and the withdraw amount credit information to the ATM control unit 112 (S88).

When the ATM control unit 112 receives the transaction verification result and the withdraw amount credit information (S89), the ATM control unit 112 generates a paper currency withdraw command in the same manner as step S22 of FIG. 5 (S90), and sends the generated paper currency withdraw command, together with the withdraw amount credit information, to the paper currency processing unit 113 (S91).

When the paper currency processing unit 113 receives the paper currency withdraw command and the withdraw amount credit information, the paper currency processing unit 113 extracts information regarding the paper currency denomination and number of paper currencies included in the paper currency withdraw command, and calculates the withdraw amount as the total amount of the paper currencies to be paid out based on the overall control firmware 200 (FIG. 13) of the paper currency processing unit control unit 180 (FIG. 13). Subsequently, the paper currency processing unit 113 sends, to the paper currency processing unit encryption processing unit 182 (FIG. 14), the withdraw amount credit information sent from the ATM control unit 112 in step S91 and the withdraw amount calculated as described above, and stores the foregoing withdraw amount credit information and calculated withdraw amount as the withdraw amount 224 (FIG. 14) and the withdraw amount credit information 225 (FIG. 14) in the memory 211 (FIG. 14) (S92).

The paper currency processing unit encryption processing unit 182 subsequently verifies whether or not there is any contradiction between the withdraw amount 224 and the withdraw amount credit information 225 stored in the memory 211 of the paper currency processing unit encryption processing unit 182 by using the DEV random number 223 (FIG. 14) stored in the memory 211 (FIG. 14) (S93). For example, the verification is performed according to the following routine when the withdraw amount credit information is realized in the form of a message authentication code or an electronic signature. Foremost, the DEV random number 223 and the withdraw amount 224 are combined, and the hash value of the consolidated data is calculated. Meanwhile, the withdraw amount credit information is decrypted by using the encryption key that is shared with the card reader encryption processing unit 132. The verification is determined to be successful when the decrypted data and the calculated hash value coincide, and the verification is determined to be unsuccessful when the decrypted data and the calculated hash value do not coincide. When the verification is successful, the paper currency processing unit 113 pays out the paper currencies in the denomination and number included in the paper currency withdraw command based on the paper currency transfer mechanism control firmware 201 (FIG. 13) of the paper currency processing unit control unit 180 (FIG. 13) (S94).

(1-3) Effect of First Embodiment

As described above, with the automatic transaction system 110 of this embodiment, the paper currency processing unit 113 compares the withdraw amount based on the withdraw amount credit information sent from the card reader 114 via the ATM control unit 112, and the withdraw amount based on the denomination and number of paper currencies included in the paper currency withdraw command sent from the ATM control unit 112, and executes the withdraw processing based on the paper currency withdraw command when there is no contradiction in the comparison result.

Thus, according to the automatic transaction system 110 of this embodiment, even when the ATM application 40 (FIG. 8) of the ATM control unit 112 is infected with malware and an unauthorized paper currency withdraw command of an unconfirmed transaction is sent from the ATM control unit 112 to the paper currency processing unit 113, because the denomination and number of paper currencies included in the paper currency withdraw command will contradict the withdraw credit information as the confirmed data of the transaction (that is, because the total amount based on the denomination and number of paper currencies included in the paper currency withdraw command will not match the withdraw amount based on the withdraw credit information), the paper currency processing unit 113 will not perform the withdraw processing based on the paper currency withdraw command.

Thus, according to this embodiment, it is possible to realize a highly reliable automatic transaction device in which unauthorized processing will not be performed even when the ATM application 40 of FIG. 8 or device control software such as the I/O control unit control software 41 and the paper currency processing unit control software 126 are fraudulently falsified with malware.

(2) Second Embodiment

In FIG. 7, reference numeral 230 represents the automatic transaction system according to the second embodiment. The automatic transaction system 230 is basically configured in the same manner as the automatic transaction system 1 of the first embodiment excluding the point that the processing contents of the ATM control unit 232 of the ATM 231 are different during the withdraw transaction processing.

In effect, with the automatic transaction system 230 according to this embodiment, rather than directly sending the withdraw amount credit information generated by the card reader encryption processing unit 240 (FIG. 9) of the card reader 233 to the paper currency processing unit 234 (FIG. 7) during the withdraw transaction processing, the foregoing withdraw amount credit information is sent to the paper currency processing unit 234 via the encryption pin pad 235 (FIG. 7). In other words, with the automatic transaction system 230, in addition to sharing the encryption key and generating sessions between the card reader encryption processing unit 240 of the card reader 233 and the encryption pin pad 235, a separate encryption key is also shared and separate sessions are also generated between the encryption pin pad 235 and the paper currency processing unit 234; specifically, the paper currency processing unit encryption processing unit 182 (FIG. 14).

As a result of interposing the encryption pin pad 235 as described above, it is possible to use the encryption function that is originally loaded in the encryption pin pad 235 to perform the encryption of inter-device communication and protect the telegrams between the ATM 231 and the accounting host computer 3 by encrypting such telegrams.

Figure 16:
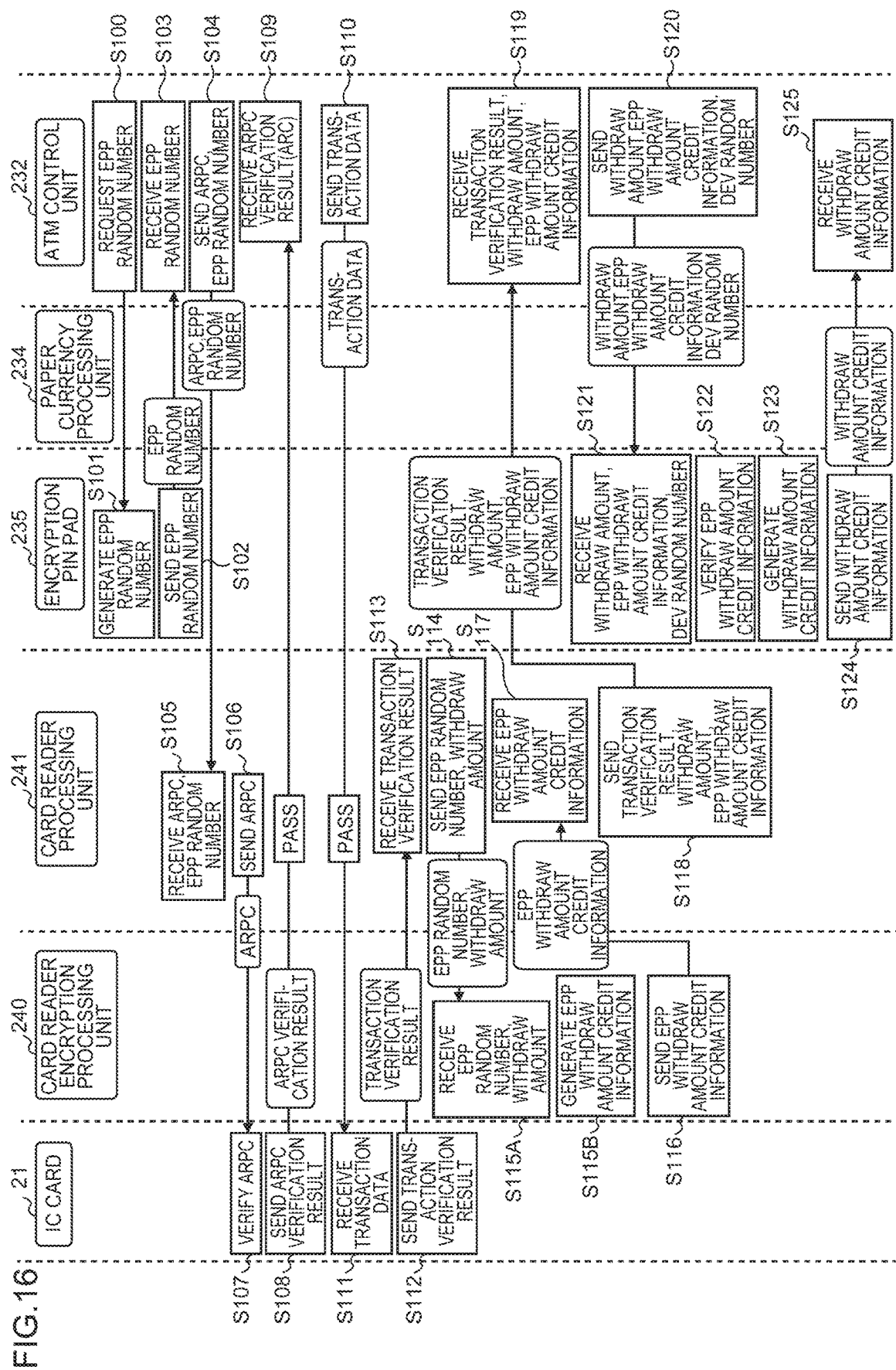
FIG. 16 is a flowchart showing a flow of the ATM withdraw transaction processing in the second embodiment.

With the automatic transaction system 230 according to this embodiment, because the contents of the processing indicated in the areas of 15-A and 15-C of FIG. 15 during the withdraw transaction processing are the same as the first embodiment, only the flow of processing corresponding to 15-B of FIG. 15, which differs from the first embodiment, is shown in FIG. 16.

In the foregoing case, when the ATM control unit 232 receives the DEV random number from the paper currency processing unit 234 (FIG. 15; S73), the ATM control unit 232 sends a request for generating an EPP (Encrypting Pin Pad) random number to the encryption pin pad 235 (S100). Moreover, when the encryption pin pad 235 receives the foregoing request, the encryption pin pad 235 internally generates an EPP random number (S101), and sends the generated EPP random number to the ATM control unit 232 (S102).

When the ATM control unit 232 receives the EPP random number (S103), the ATM control unit 232 sends the ARPC sent from the accounting host computer 3, the transaction feasibility data required for verification, and the EPP random number received in step S103 to the card reader control unit 241 (S104). Note that, in order to simplify the diagram, the description of the transaction feasibility data has been omitted in step S104 to S107 of FIG. 16.

Moreover, when the card reader control unit 241 receives the ARPC, the transaction feasibility data and the EPP random number (S105), the card reader control unit 241 sends the received ARPC and transaction feasibility data to the IC card 21 (S106). When the IC card 21 receives the ARPC and the transaction feasibility data, the IC card 21 verifies the legitimacy of the transaction feasibility data based on the content of the ARPC (S107), and sends the ARPC verification result to the ATM control unit 232 (S108).

When the ATM control unit 232 receives the ARPC verification result (S109), the ATM control unit 232 confirms the content of the ARPC verification result, and, when the content is the approval of the transaction, newly generates transaction data which matches the request of the IC card 21 and sends the newly generated transaction data to the IC card 21 (S110). When the IC card 21 receives the transaction data (S111), the IC card 21 generates transaction verification result containing "TC" when the transaction may be established and containing "AAC" when the transaction is to be refused, and sends the generated transaction verification result to the card reader control unit 241 (S112).

When the card reader control unit 241 receives the foregoing transaction verification result (S113), the card reader control unit 241 sends the withdraw amount stored in the overall control buffer 153 (FIG. 10) and EPP random number received in step S105 to the card reader encryption processing unit 240 (S114). Here, the withdraw amount stored in the overall control buffer 153 (FIG. 10) is the withdraw amount that was extracted from the transaction data 62 and stored in the overall control buffer 153 by the card reader control unit 241 of the card reader 233 as described above upon the card reader 233 intermediating the transaction data 62 sent from the ATM control unit 232 to the IC card 21 in step S3 of FIG. 5.

When the card reader encryption processing unit 240 receives the withdraw amount and the EPP random number (S115A), the card reader encryption processing unit 240 generates EPP withdraw amount credit information by using the EPP random number, and the encryption key that is shared with the encryption pin pad 235 (S115B), and sends the generated EPP withdraw amount credit information to the card reader control unit 241 (S116).

When the card reader control unit 241 receives the EPP withdraw amount credit information (S117), the card reader control unit 241 sends the transaction verification result, the withdraw amount and the EPP withdraw amount credit information to the ATM control unit 232 (S118). Moreover, when the ATM control unit 232 receives the transaction verification result, the withdraw amount and the EPP withdraw amount credit information (S119), the ATM control unit 232 sends the DEV random number, together with the withdraw amount and the EPP withdraw amount credit information, to the encryption pin pad 235 (S120).

When the encryption pin pad 235 receives the DEV random number, the withdraw amount and the EPP withdraw amount credit information from the ATM control unit 232 (S121), the encryption pin pad 235 verifies the withdraw amount and the EPP withdraw amount credit information based on the same processing as S93 (S122). When the verification result of the foregoing verification is correct, the encryption pin pad 235 generates withdraw amount credit information by using the DEV random number and the withdraw amount, and the encryption key that is shared with the paper currency processing unit 234 (S123), and sends the generated withdraw amount credit information to the ATM control unit 232 (S124).

Consequently, when the ATM control unit 232 receives the withdraw amount credit information (S125), the processing of step S90 onward of the first embodiment described with reference to FIG. 15 is thereafter executed, and the required amount of paper currency is thereby paid out by the paper currency processing unit 234.

With the automatic transaction system 230 of this embodiment described above, the withdraw amount credit information generated by the card reader encryption processing unit 240 of the card reader 233 is sent to the paper currency processing unit 234 via the encryption pin pad 235, and the paper currency processing unit 234 compares the withdraw amount based on the withdraw amount credit information and the withdraw amount based on the denomination and number of paper currencies included in the paper currency withdraw command sent from the ATM control unit 232, and executes the withdraw processing based on the paper currency withdraw command when there is no contradiction in the comparison result (when the comparison result is a match).

Thus, according to the automatic transaction system 230 of this embodiment, similar to the first embodiment, even when the ATM application 40 (FIG. 8) of the ATM control unit 232 is infected with malware and an unauthorized paper currency withdraw command of an unconfirmed transaction is sent from the ATM control unit 232 to the paper currency processing unit 234, because the denomination and number of paper currencies included in the paper currency withdraw command will contradict the withdraw credit information as the confirmed data of the transaction, the paper currency processing unit 234 will not perform the withdraw processing based on the paper currency withdraw command.

Thus, according to this embodiment, similar to the first embodiment, it is possible to realize a highly reliable automatic transaction device in which unauthorized processing will not be performed even when the ATM application 40 of FIG. 8 or device control software such as the I/O control unit control software 41 and the paper currency processing unit control software 126 are fraudulently falsified with malware.

(3) Third Embodiment

Figure 17:
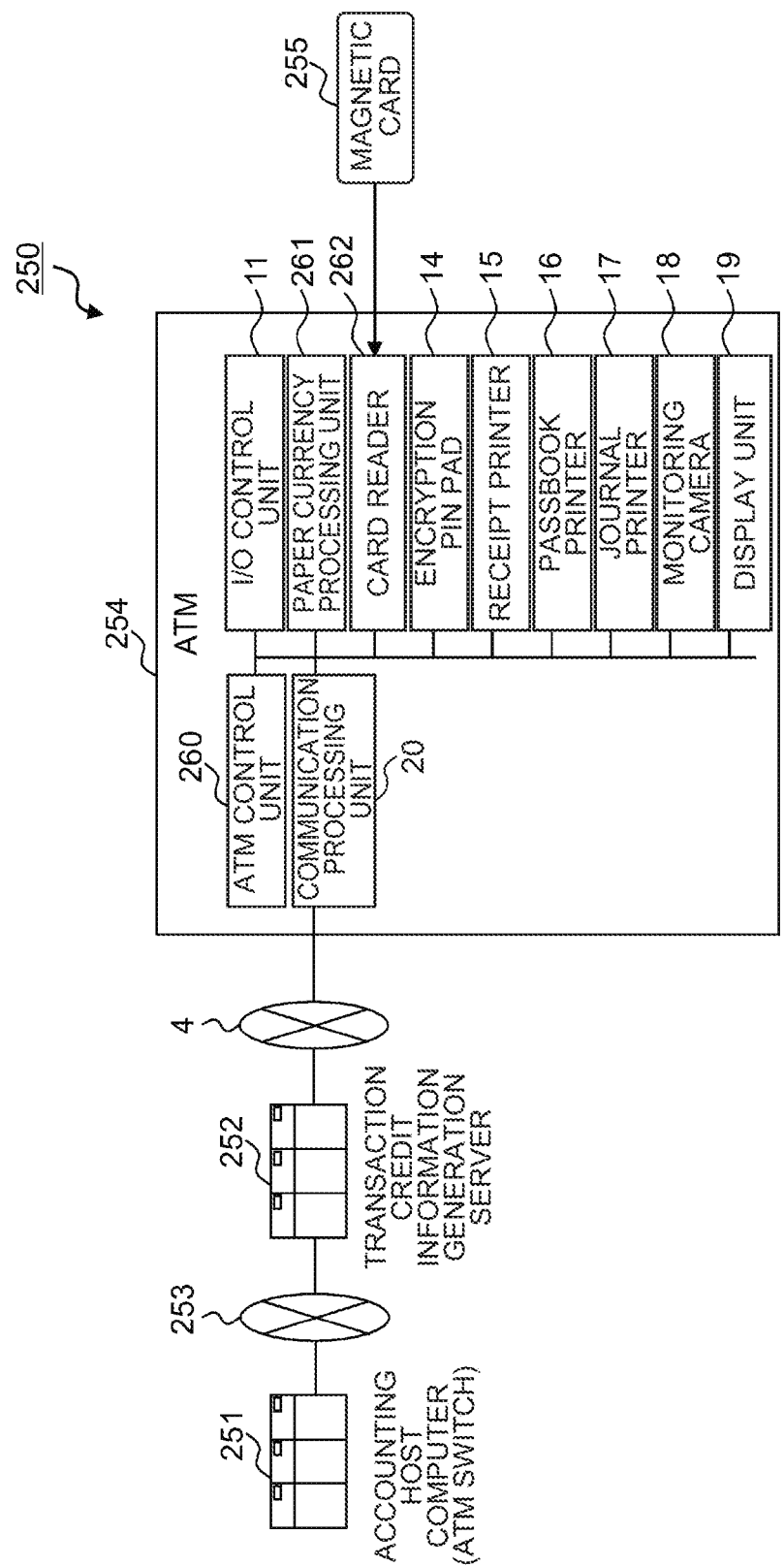
FIG. 17 is a block diagram showing a schematic configuration of an automatic transaction system according to the third embodiment.

The third embodiment is now explained with reference to FIG. 17 to FIG. 21B. FIG. 17, in which the components corresponding to those of FIG. 1 are given the same reference numeral, shows the automatic transaction system 250 according to the third embodiment. The automatic transaction system 250 is configured by an accounting host computer 251 and a transaction credit information generation server 252 being connected via a network 253, and a transaction credit information generation server 252 being connected to one or more ATMs 254 via a network 4. Moreover, the transaction credit information generation server 252 can also be referred to as an upper-level device of the ATM of an external computer located outside the ATM.

Here, the automatic transaction system 250 of this embodiment differs considerably from the automatic transaction system 110, 230 of the first and second embodiments with respect to the point of using a magnetic card 255, rather than an IC card 21, as the card medium. The magnetic card 255 contains, in its magnetic stripe, information for identifying the customer's account number and other information.

Thus, with the automatic transaction system 250 of this embodiment, the generation of the ARQC and the verification of the ARPC performed in relation to the transaction data, which were conventionally processed by the IC card 21, are processed by the card reader encryption processing unit 292 (FIG. 20) of the card reader 262. Moreover, with the automatic transaction system 250 of this embodiment, the verification of the ARQC and the generation of the ARPC, which were processed by the accounting host computer 3 of the automatic transaction system 1, 230 in the first and second embodiments, are processed by the transaction credit information generation server 252. Because the accounting host computer 251 of this embodiment is unable to exchange electronic signatures with the IC card 21, it is assumed that the accounting host computer 251 will only handle transaction data and transaction feasibility data.

Figure 20:
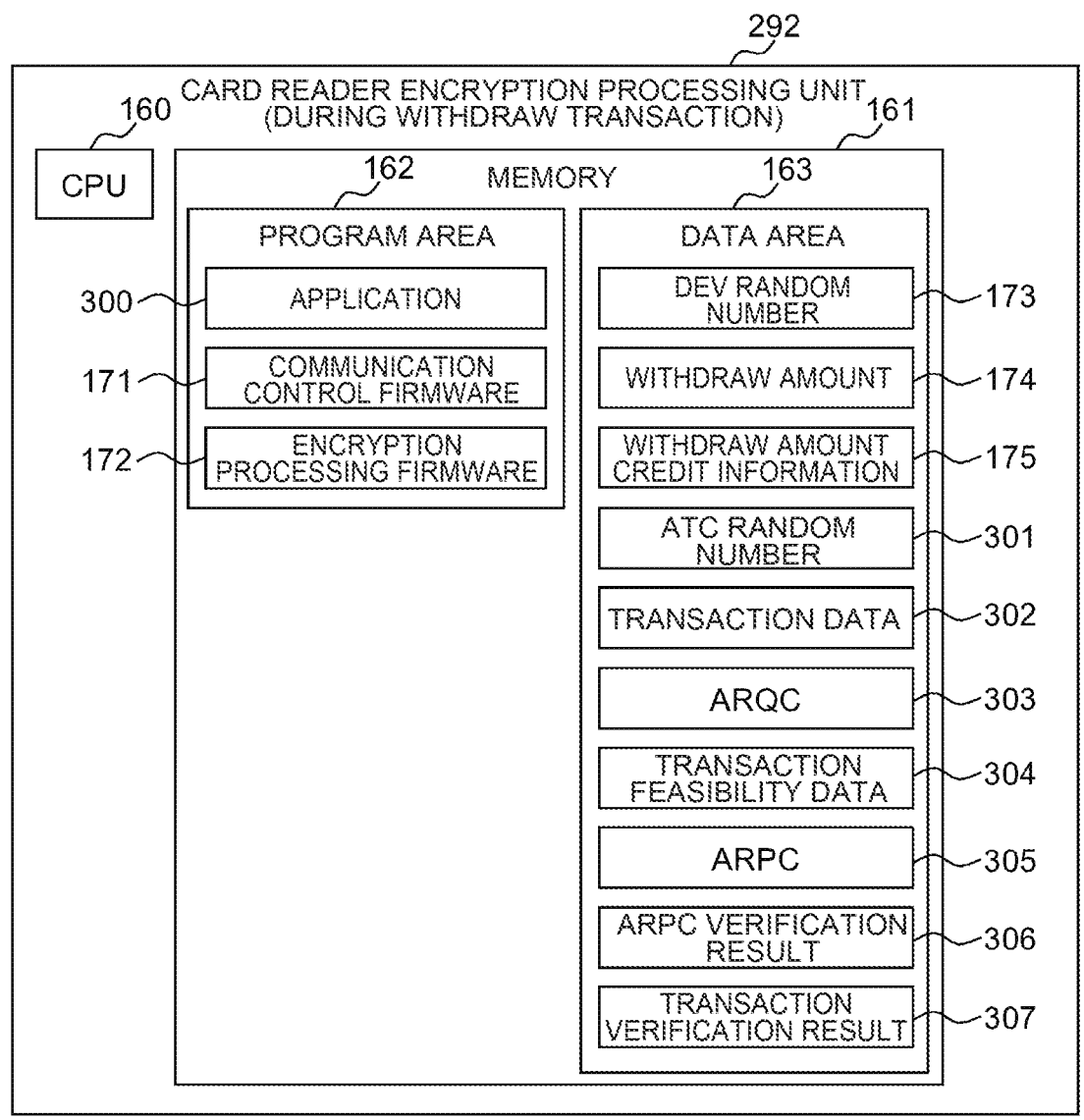
FIG. 20 is a block diagram showing a functional configuration of a card reader encryption processing unit according to the third embodiment.

Note that, in the ensuing explanation, let it be assumed that the acquisition of the card number of the magnetic card 255 and the verification of the personal identification number required for personal identification have already been completed as with the first embodiment. Moreover, let it also be assumed that the sharing of encryption keys and the generation of sessions required for the exchange of electronic signatures and credit data have already been completed between the transaction credit information generation server 252 and the card reader encryption processing unit 292 (FIG. 20) of the card reader 262, and between the card reader encryption processing unit 292 and the paper currency processing unit encryption processing unit 182 (FIG. 14) of the paper currency processing unit 261 (FIG. 17). Furthermore, let it also be assumed that the card number of the magnetic card 255 has already been stored in the card reader encryption processing unit 292 (FIG. 20).

Figure 18:
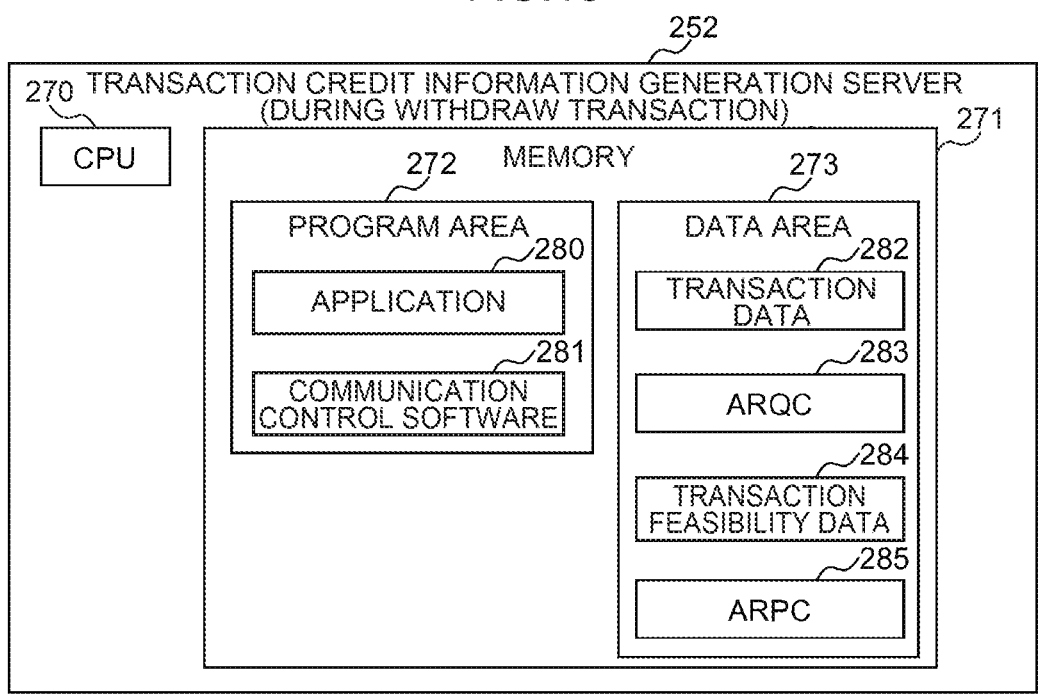
FIG. 18 is a block diagram showing a schematic configuration of a transaction credit information generation server.

FIG. 18 is a diagram showing a configuration of the transaction credit information generation server 252. The transaction credit information generation server 252 is configured by comprising information processing resources such as a CPU 270 which governs the operational control of the overall transaction credit information generation server 252, and a memory 271 configured from a semiconductor memory or the like.

In the foregoing case, the storage area of the memory 271 is managed by being divided into a program area 272 and a data area 273, wherein the program area 272 stores an application 280 and communication control firmware 281, and the data area 273 stores transaction data 282, an ARQC 283, transaction feasibility data 284 and an ARPC 285.

The application 280 is software with a function of performing the overall control of the transaction credit information generation server 252, and the communication control software 281 is software with a function of performing the communication control between the accounting host computer 251 (FIG. 17) and the ATM 254 (FIG. 17). Note that, because the transaction data 282, the ARQC 283, the transaction feasibility data 284 and the ARPC 285 are the same as the transaction data 83, the ARQC 84, the transaction feasibility data 85 and the ARPC 86 stored in the memory 71 of the accounting host computer 3 of the first embodiment described above with reference to FIG. 3, the explanation thereof is omitted.

Figure 19:
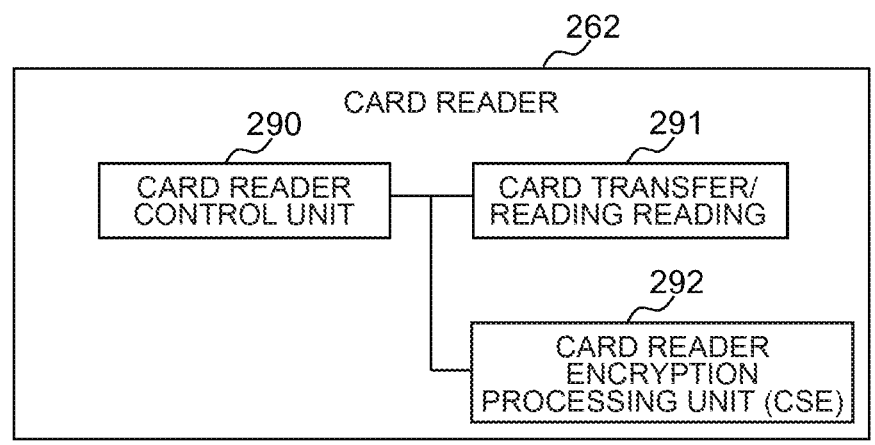
FIG. 19 is a block diagram showing a functional configuration of a card reader according to the third embodiment.

Moreover, FIG. 19 is a diagram showing a configuration of the card reader 262 of this embodiment. The card reader 262 is configured by comprising a card reader control unit 290, a card transfer/reading unit 291 and a card reader encryption processing unit 292. Because the card reader control unit 290 and the card transfer/reading unit 291 basically have the same configuration as the card reader control unit 130 and the card transfer/reading unit 131 of the card reader 114 according to the first embodiment described above with reference to FIG. 9, the explanation thereof is omitted.

FIG. 20, in which the components corresponding to those of FIG. 11 are given the same reference numeral, is a diagram showing a hardware configuration of the card reader encryption processing unit 292 and a data configuration during a withdraw transaction according to this embodiment. As evident from FIG. 20, with the card reader encryption processing unit 292 of this embodiment, the data area 163 of the memory 161 stores an ATC random number 301, transaction data 302, an ARPC 303, transaction feasibility data 304, an ARPC 305, an ARPC verification result 306 and a transaction verification result 307 in addition to the DEV random number 173, the withdraw amount 174 and the withdraw amount credit information 175.

Note that, because the ATC random number 301, the transaction data 302, the ARPC 303, the transaction feasibility data 304, the ARPC 305, the ARPC verification result 306 and the transaction verification result 307 are the same as the ATC random number 103, the transaction data 104, the ARPC 105, the transaction feasibility data 106, the ARPC 107, the ARPC verification result 108 and the transaction verification result 109 retained by the IC card 21 in the first embodiment as described with reference to FIG. 4, the explanation thereof is omitted.

Figure 21A:
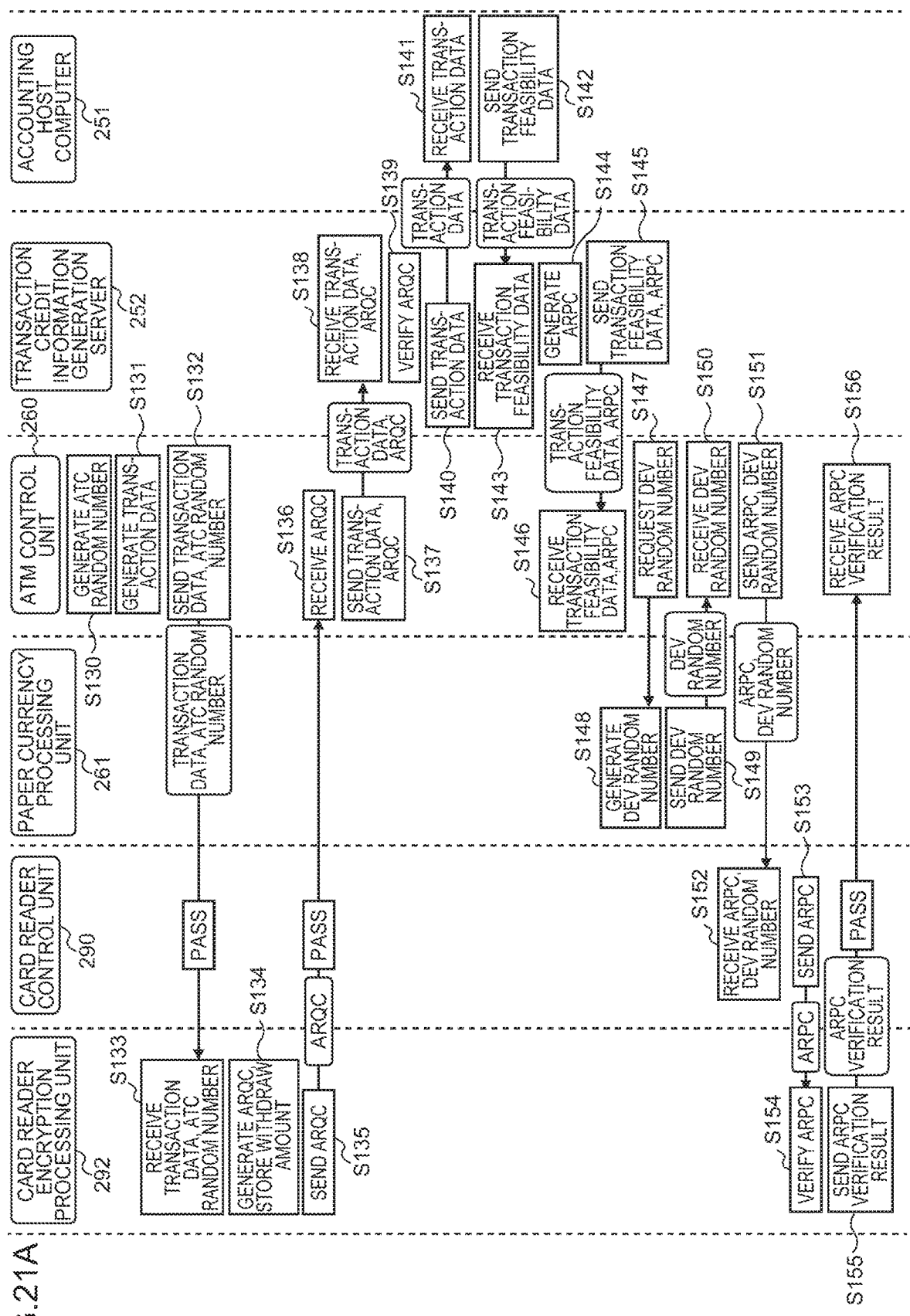
FIG. 21A is a flowchart showing a flow of the ATM withdraw transaction processing in the third embodiment.

FIG. 21A and FIG. 21B are diagrams showing the flow of the transaction processing performed in the automatic transaction system 250 according to this embodiment. Because the processing of step S130 to step S136 is the same as the processing of step S1 to step S7 of FIG. 5, the explanation thereof is omitted. However, while the IC card 21 performed the processing of step S4 to step S6 in FIG. 5, this embodiment is different with respect to the point that such processing is performed by the card reader encryption processing unit 292 in FIG. 21A and FIG. 21B.

Subsequently, with the automatic transaction system 250, after the processing of step S136 is completed, the ATM control unit 260 sends the transaction data and the ARQC to the transaction credit information generation server 252 (S137).

When the transaction credit information generation server 252 receives the transaction data and the ARQC (S138), the transaction credit information generation server 252 verifies the received ARQC (S139). Subsequently, when the transaction credit information generation server 252 obtains a verification result that the ARQC is legitimate as a result of the foregoing verification, the transaction credit information generation server 252 sends the transaction data to the accounting host computer 251 (S140).

When the accounting host computer 251 receives the transaction data, in the same manner as the transaction of the conventional magnetic card 255, the accounting host computer 251 confirms the user's account balance and credit information and verifies whether or not the withdraw transaction may be performed (S141), and then sends the transaction feasibility data to the transaction credit information generation server 252 (S142).

When the transaction credit information generation server 252 receives the transaction feasibility data (S143), the transaction credit information generation server 252 generates a corresponding ARPC (S144), and sends the generated ARPC, together with the transaction feasibility data, to the ATM 254 (FIG. 17) (S145).

When the ATM control unit 260 of the ATM 254 receives the ARPC and the transaction feasibility data (S146), the ATM control unit 260 coordinates with the paper currency processing unit 261 and performs the processing of step S147 to step S160 in the same manner as the processing of step S70 to step S83 of the first embodiment described above with reference to FIG. 15. However, while the IC card 21 performed the processing of step S77, step S78, step S81 and step S82 in FIG. 15, the card reader encryption processing unit 292 performs the corresponding processing of step S154, step S155, step S158 and step S159 in FIG. 21A and FIG. 21B. The processing of step S161 to step S171 is performed in the same manner as the processing of step S84 to step S94 of FIG. 15. Note that, in order to simplify the diagram, the description of the transaction feasibility data has been omitted in step S151 to step S154 of FIG. 21A in the same manner as FIG. 15.

As described above, with the automatic transaction system 250 of this embodiment, the paper currency processing unit 261 compares the withdraw amount based on the withdraw amount credit information sent from the card reader 262 via the ATM control unit 260, and the denomination and number of paper currencies included in the paper currency withdraw command sent from the ATM control unit 2602, and executes the withdraw processing based on the paper currency withdraw command when there is no contradiction in the comparison result.

Thus, according to the automatic transaction system 250 of this embodiment, similar to the first embodiment, even when the ATM application 40 (FIG. 8) of the ATM control unit 260 is infected with malware and an unauthorized paper currency withdraw command of an unconfirmed transaction is sent from the ATM control unit 260 to the paper currency processing unit 261, because the withdraw amount based on the denomination and number of paper currencies included in the paper currency withdraw command will contradict (will not match) the withdraw amount based on the withdraw credit information as the confirmed data of the transaction, the paper currency processing unit 261 will not perform the withdraw processing based on the paper currency withdraw command.

Thus, according to this embodiment, similar to the first embodiment, it is possible to realize a highly reliable automatic transaction device in which unauthorized processing will not be performed even when the ATM application 40 of FIG. 8 or device control software such as the I/O control unit control software 41 and the paper currency processing unit control software 126 are fraudulently falsified with malware.

(4) Fourth Embodiment

The fourth embodiment is now explained with reference to FIG. 7 to FIG. 14 and FIG. 22 to FIG. 24B. This embodiment is an embodiment related to the ATM deposit transaction processing in the automatic transaction system 110 of the first embodiment.

In this embodiment, among the various types of data stored in the data area 33 of the ATM control unit 112 described above with reference to FIG. 8, the card number 60, the ATC random number 61, the transaction data 62, the ARQC 63, the transaction feasibility data 64, the ARPC 65, the ARPC verification result 66, the transaction verification result 67, the paper currency processing unit control data 68, the deposited paper currency amount 69, the deposited paper currency amount credit information 123 and the first CR random number 124 are used.

The deposited paper currency amount credit information 123 is credit information in relation to the deposited paper currency amount 69, and is generated by the paper currency processing unit 113 by using the first CR random number 124. The deposited paper currency amount credit information 123 is information with security that is higher than the deposited paper currency count information or the transaction data. The first CR random number 124 is a random number that is generated by the card reader encryption processing unit 132 (FIG. 11) of the card reader 114, and is used by the paper currency processing unit 113 (FIG. 7) upon generating the deposited paper currency amount credit information 123. This random number is also used for preventing the replay attack of credit information as with the other random numbers. In the case of this embodiment, the data configuration of the card reader encryption processing unit 132 described above with reference to FIG. 11 will be as shown in FIG. 22. The card number 310 is a card number that is stored in the IC card 21, and is data that is sent from the IC card 21 via the card reader control unit 130 (FIG. 10). The first CR random number 311 is a random number that is generated by the card reader encryption processing unit 132, and is used by the paper currency processing unit 113 upon generating the deposited paper currency amount credit information 312. This random number is also used for preventing the replay attack of credit information as with the other random numbers. The deposited paper currency amount credit information 312 is credit information in relation to the deposit amount in transaction data 314, and is generated by the paper currency processing unit 113 by using the first CR random number 311 upon counting the number of paper currencies that were deposited.

The deposit destination card number in transaction data 313 is a card number that is included in the transaction data generated by the ATM control unit 112 (FIG. 8). If the transaction data has not been falsified, then the deposit destination card number in transaction data 313 will match the card number stored in the IC card 21. The deposit amount in transaction data 314 is a total amount of the deposited paper currencies counted by the paper currency processing unit 113. The verification result of card number and deposit amount in transaction data 315 is a result of verifying the card number and deposit amount in the transaction data to determine whether or not the data has been falsified by using the card number 310 and the deposited paper currency amount credit information 312, respectively.

Figure 23:
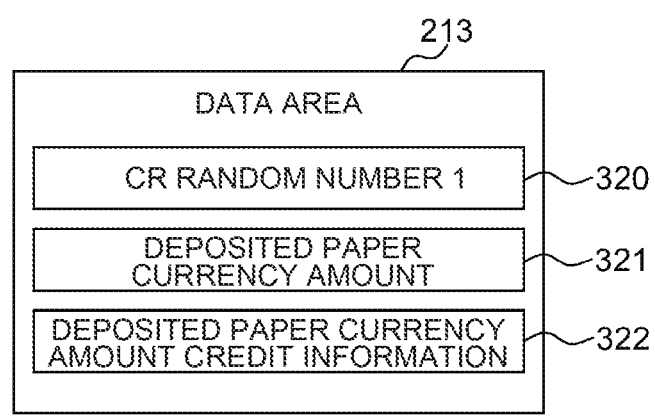
FIG. 23 is a block diagram showing a data configuration of a paper currency processing unit encryption processing unit in the fourth embodiment.

Moreover, in the case of this embodiment, the data configuration of the paper currency processing unit encryption processing unit 182 described above with reference to FIG. 14 will be as shown in FIG. 23. The first CR random number 320 is the same data as the first CR random number 311 described above with reference to FIG. 22, is generated by the card reader encryption processing unit 132, and is used by the paper currency processing unit 113 upon generating the deposited paper currency amount credit information 322. The deposited paper currency amount 321 is a total amount of the deposited paper currencies counted by the paper currency processing unit 113, and is the same data as the deposit amount in transaction data 314 described above with reference to FIG. 22 if the transaction data has not been falsified. The deposited paper currency amount credit information 322 is credit information in relation to the deposited paper currency amount 321, and is generated by using the first CR random number 320 and the deposited paper currency amount 321, and the encryption key that is shared with the card reader encryption processing unit 132 (FIG. 11). The deposited paper currency amount credit information 322 is the same data as the deposited paper currency amount credit information 312. The deposited paper currency amount credit information 332 and the deposited paper currency amount credit information 312 are information with security that is higher than the deposited paper currency count information or the transaction data.

The flow of the ATM deposit transaction processing executed in the automatic transaction system 110 is now explained with reference to FIG. 24A and FIG. 24B. Here, let it be assumed that the sharing of encryption keys and the generation of sessions required for generating credit information between the card reader encryption processing unit 132 (FIG. 11) and the paper currency processing unit encryption processing unit 182 (FIG. 14) have already been completed. Moreover, the only difference with the conventional ATM deposit transaction processing described above with reference to FIG. 6A and FIG. 6B is the part of 6-A of FIG. 6A (step S30 to step S41). Thus, because the processing of the part of 6-B in FIG. 6A and FIG. 6B (step S43 to step S64) is common, the explanation thereof is omitted.

Foremost, when a card number is sent from the IC card 21 (S180), the card reader control unit 130 receives the sent card number (S181), and sends the received card number to the card reader encryption processing unit 132 (FIG. 11) (S182). The card reader encryption processing unit 132 stores the received card number as the card number 310 (FIG. 22) in the memory 161 (FIG. 11) (S183). Subsequently, the card reader control unit 130 (FIG. 10) sends the card number to the ATM control unit 112 (FIG. 8) (S184), and the ATM control unit 112 stores the received card number as the card number 60 (FIG. 8) in the memory 31 (FIG. 8) (S185).

Subsequently, the ATM control unit 112 sends a request for generating a first CR random number to the card reader encryption processing unit 132 (FIG. 11) (S186). and then the card reader encryption processing unit 132 generates a first CR random number according to the request (S187), and sends the generated first CR random number to the ATM control unit 112 (S188).

When the ATM control unit 112 receives the first CR random number (S189), the ATM control unit 112 sends a deposited paper currency count command, and the received first CR random number, to the paper currency processing unit 113 (FIG. 12) (S190).

When the paper currency processing unit 113 receives the deposited paper currency count command and the first CR random number (S191), the paper currency processing unit 113 counts the number of paper currencies deposited in the deposit/withdraw port of the ATM 111 (S192A), generates deposited paper currency amount credit information in relation to the deposited paper currency amount in the paper currency processing unit encryption processing unit 182 by using the first CR random number (S192B), and sends the generated deposited paper currency amount credit information, together with the deposited paper currency amount, to the ATM control unit 112 (S193).

When the ATM control unit 112 receives the deposited paper currency amount credit information and the deposited paper currency amount (S194), the ATM control unit 112 generates transaction data including the ATC random number and the deposited paper currency amount in the same manner as step S39 and step S40 of FIG. 6A (S195, S196). Subsequently, the ATM control unit 112 sends the generated transaction data and ATC random number, and the deposited paper currency amount credit information, to the card reader control unit 130 (S197).

When the card reader control unit 130 receives the transaction data, the ATC random number and the deposited paper currency amount credit information (S198), the card reader control unit 130 extracts the card number and the deposit amount (equivalent to the deposited paper currency amount) included in the transaction data, and sends the extracted card number and deposit number, together with the deposited paper currency amount credit information, to the card reader encryption processing unit 132 (S199).

Moreover, when the card reader encryption processing unit 132 receives the card number, the deposit amount and the deposited paper currency amount credit information (S200), the card reader encryption processing unit 132 verifies whether the card number 310 (FIG. 22) stored in the memory 161 (FIG. 11) in step S183 and the received card number are a match, and verifies whether the received deposit amount and the deposit amount based on the deposited paper currency amount credit information are match, and stores the verification result as the verification result of card number and deposit amount in transaction data 315 in the memory 161 (FIG. 11) (S201). The card reader encryption processing unit 132 thereafter sends the verification result to the card reader control unit 130 (S202).

When the card reader control unit 130 receives the verification result (S203), the card reader control unit 130 determines whether or not to perform the processing of step S204 based on the received verification result. The card reader control unit 130 sends the received transaction data and ATC random number to the IC card 21 only when there is no contradiction in either the card number or the deposit amount as the verification result (only when both the card number and the deposit amount in the transaction data coincide with the values anticipated by each of their credit information) (S204).

Consequently, when the IC card 21 receives the transaction data and the ATC random number (S205), the processing of step S43 onward described above with reference to FIG. 6A and FIG. 6B is executed.

Note that, if there is any contradiction in at least the card number and the deposit amount in step S203 (if either the card number or the deposit amount is not a match), the card reader control unit 130 may notify the ATM control unit 112 to such effect, and the ATM control unit 112 may display a warning or the like on the display unit 19.

As described above, with the automatic transaction system 110 of this embodiment, even when a deposit amount that is greater than the amount of paper currencies counted by the paper currency processing unit 113 is generated by the ATM control unit 112 and sent to the card reader control unit 130, because the deposit amount in the transaction data and the deposited paper currency amount credit information will be contradictory, the generation of the ARQC required for the deposit transaction will not be generated by the IC card 21. Consequently, it will not be possible to perform a deposit transaction with the accounting host computer 3 based on an unauthorized deposit amount.

In addition, with the automatic transaction system 110 of this embodiment, even when transaction data including an unauthorized card number is sent from the ATM control unit 12 to the card reader control unit 130 in an attempt to deposit money into an account other than the legitimate account, the card reader 114 is storing the card number read from the IC card 21, and is able to thereby compare the card numbers. Thus, it is possible to prevent the generation of an ARQC which is required for depositing money in an account other than the legitimate account, and an unauthorized deposit to an account other than the legitimate account can thereby be prevented.

Thus, according to this embodiment, it is possible to realize a highly reliable automatic transaction device in which unauthorized processing will not be performed even when the ATM application 40 of FIG. 8 or device control software such as the I/O control unit control software 41 and the paper currency processing unit control software 126 are fraudulently falsified with malware.

(5) Fifth Embodiment

The fifth embodiment is now explained with reference to FIG. 7 to FIG. 14 and FIG. 25 to FIG. 27B. This embodiment anticipates a case where, in the automatic transaction system 110 of the first embodiment, the account number of the deposit destination is not acquired from the IC card 21, but rather input using the encryption pin pad 325 (FIG. 7). In other words, this embodiment is an embodiment related to the ATM deposit transaction processing anticipating a case where paper currency is deposited in the ATM 111 and transferred to another account.

In this embodiment, among the various types of data stored in the data area 33 of the ATM control unit 112 described above with reference to FIG. 8, the card number 60, the ATC random number 61, the transaction data 62, the ARQC 63, the transaction feasibility data 64, the ARPC 65, the ARPC verification result 66, the transaction verification result 67, the paper currency processing unit control data 68, the deposit amount 69, the deposited paper currency amount credit information 123, the first CR random number 124 and the second CR random number 125 are used.

in the case of this embodiment, the data configuration of the card reader encryption processing unit 132 described above with reference to FIG. 11 will be as shown in FIG. 25. The first CR random number is used by the paper currency processing unit 113 upon generating the deposited paper currency amount credit information 333, and the second CR random number is used by the encryption pin pad 115 upon generating the payee card number credit information 332. These random numbers are also used for preventing the replay attack of credit information as with the other random numbers.

The payee card number credit information 332 is used by the card reader encryption processing unit 132 (FIG. 11) of the card reader 114 (FIG. 9) to verify that the payee card number input with the encryption pin pad 325 has not been falsified. The payee card number credit information 332 is generated by using the second CR random number 331, and the payee card number that was input via the encryption pin pad 325, and data is sent from the encryption pin pad 325. The destination card number credit information 332 is information with security that is higher than the destination card number or the transaction data. The deposited paper currency amount credit information 333 is credit information in relation to the deposited paper currency amount as the total amount of the number of paper currencies that were counted by the paper currency processing unit 113 (FIG. 7), and is generated by the paper currency processing unit 113 by using the first CR random number 330. The deposited paper currency amount credit information 333 is information with security that is higher than the deposited paper currency amount or the transaction data.

The payee card number in transaction data 334 is a payee card number that is included in the transaction data generated by the ATM control unit 112 (FIG. 7). The deposit amount in transaction data 335 is a deposit transaction amount included in the transaction data as with the payee card number in transaction data 334. The verification result of payee card number and deposit amount in transaction data 336 is a result of verifying whether or not the payee card number in transaction data 334 and the deposit amount in transaction data 335 have been falsified by using the payee card number credit information 332 and the deposited paper currency amount credit information 333, respectively.

Figure 26:
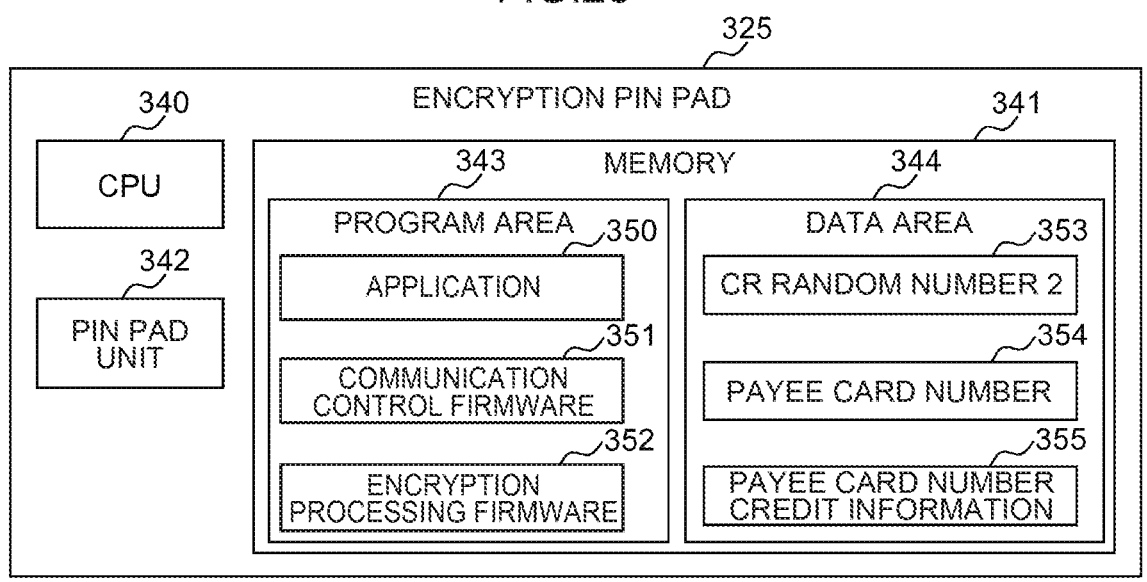
FIG. 26 is a block diagram showing a functional configuration of an encryption pin pad in the fifth embodiment.

FIG. 26 is a diagram showing a schematic hardware configuration of the encryption pin pad 325 and a data configuration of the part related to the function of inputting the payee card number with the encryption pin pad 325. As evident from FIG. 26, the encryption pin pad 325 is configured by comprising information processing resources such as a CPU 340 which governs the operational control of the overall encryption pin pad 325, and a memory 341 configured from a semiconductor memory or the like, and a pin pad unit 342 having a numeric keypad.

In the foregoing case, the storage area of the memory 341 is managed by being divided into a program area 343 and a data area 344, wherein the program area 343 stores an application 350, communication control firmware 351 and encryption processing firmware 352, and the data area 344 stores a second CR random number 353, a payee card number 354 and payee card number credit information 355.

The application 350 is software with a function of performing the overall control of the encryption pin pad 325, and the communication control firmware 351 is software with a function of performing the communication control with the ATM control unit 112 (FIG. 8). Moreover, the encryption processing firmware 352 is firmware with a function of generating and verifying electronic signatures as credit information. The encryption processing firmware 352 may concurrently serve as the encryption function of encrypting the personal identification number (PIN).

Moreover, the second CR random number 353 is a random number required for generating the payee card number credit information 355, and is generated by and sent from the card reader encryption processing unit 132 (FIG. 11). The payee card number 354 is a card number of the payee that was input with the encryption pin pad 325. The payee card number credit information 355 is generated by using the second CR random number 353 and the payee card number 354, and is used for verifying whether or not the payee card number in the transaction data sent from the card reader control unit 130 (FIG. 10) has been falsified. The flow of the ATM deposit transaction processing executed in the automatic transaction system 110 is now explained with reference to FIG. 27A and FIG. 27B. Here, let it be assumed that the sharing of encryption keys and the generation of sessions required for generating credit information between the card reader encryption processing unit 132 (FIG. 11) and the paper currency processing unit encryption processing unit 182 (FIG. 14) of the paper currency processing unit 113, and between the encryption pin pad 325 and the card reader encryption processing unit 132, have already been completed. Moreover, because the processing of step S180 to step S185 in FIG. 24A is common with this embodiment, the explanation thereof is omitted. Moreover, as with FIG. 24A, because the processing of step S43 to step S64 in FIG. 6A and FIG. 6B is also common with this embodiment, the explanation thereof is also omitted.

After the processing of step S180 to step S185 described above with reference to FIG. 24A is ended, the ATM control unit 112 requests the card reader encryption processing unit 132 to generate a first CR random number and a second CR random number (S210).

When the card reader encryption processing unit 132 receives the foregoing request, the card reader encryption processing unit 132 generates the requested first CR random number and second CR random number (S211), and sends the generated first and second CR random numbers to the ATM control unit 112 (S212). Moreover, when the ATM control unit 112 receives the first and second CR random numbers (S213), the ATM control unit 112 sends the card number input command and the second CR random number to the encryption pin pad 325 (S214).

When the encryption pin pad 325 receives the card number input command and the second CR random number, the encryption pin pad 325 stores the received second CR random number as the second CR random number 353 (FIG. 26) in the memory 341 (FIG. 26) (S215). Moreover, the encryption pin pad 325 causes the user of the ATM 111 to input the payee card number, and stores the input payee card number as the payee card number 354 (FIG. 26) in the memory 341 (S216A). Subsequently, the encryption pin pad 325 generates the payee card number credit information 355 (FIG. 26) as the credit information in relation to the input payee card number by using the second CR random number 353 (FIG. 26) and the payee card number 354 (FIG. 26) stored in the memory 341 (S216B), and sends the generated payee card number credit information 355, together with the payee card number 354, to the ATM control unit 112 (S217).

When the ATM control unit 112 receives the payee card number 354 and the payee card number credit information 355 (S218), the ATM control unit 112 sends the deposited paper currency count command and the first CR random number received in step S213 to the paper currency processing unit 113 (S219). Subsequently, the processing of step S219 to step S225 is executed in the same manner as the processing of step S190 to step S196 of FIG. 24A. Subsequently, the ATM control unit 112 sends the transaction data, the payee card number credit information, the deposited paper currency amount credit information, and the ATC random number to the card reader control unit 130 (S226).

When the card reader control unit 130 receives the transaction data, the payee card number credit information, the deposited paper currency amount credit information, and the ATC random number (S227), the card reader control unit 130 extracts the payee card number and the deposit amount from the received transaction data, and sends the extracted payee card number and deposit amount, together with the payee card number credit information and the deposited paper currency amount credit information, to the card reader encryption processing unit 132 (S228).

When the card reader encryption processing unit 132 receives the payee card number, the deposit amount, the payee card number credit information and the deposited paper currency amount credit information (S229), the card reader encryption processing unit 132 verifies whether or not the payee card number included in the transaction data and the payee card number based on the payee card number credit information are contradictory (are a match), and whether or not the deposit amount included in the transaction data and the deposit amount based on the deposited paper currency amount credit information are contradictory (are a match) (S230), respectively. The card reader encryption processing unit 132 thereafter sends the verification results to the card reader control unit 130 (S231). When the card reader control unit 130 receives the foregoing verification results, the card reader control unit 130 determines whether or not the processing of S233 should be executed based on the verification results (S232). When the card reader control unit 130 determines that the verification results are not contradictory with either the payee card number or the deposit amount (match both the payee card number and the deposit amount), the card reader control unit 130 sends the transaction data and the ATC random number received in step S227 to the IC card 21 (S233).

Consequently, when the IC card 21 receives the transaction data and the ATC random number (S233), the processing of step S43 onward described above with reference to FIG. 6A and FIG. 6B is executed.

As described above, with the automatic transaction system 110 of this embodiment, as with the fourth embodiment, even when a deposit amount that is greater than the amount of paper currencies counted by the paper currency processing unit 113 is generated by the ATM control unit 112 and sent to the card reader control unit 130, the card reader 114 will not perform any transaction with the accounting host computer 3 based on an unauthorized deposit amount because the deposit amount in the transaction data and the deposit amount based on the deposited paper currency amount credit information will be contradictory.

In addition, with the automatic transaction system 110 of this embodiment, even when transaction data including an unauthorized card number is sent from the ATM control unit 12 to the card reader control unit 130 in an attempt to deposit money into an account other than the designated account, the processing is discontinued. In other words, because the payee card number based on the payee card number credit information generated by the encryption pin pad 325 and the payee card number included in the transaction data will be contradictory, it is possible to prevent the generation of an ARQC which is required for depositing money in an account other than the designated account, and an unauthorized deposit to an account other than the designated account can thereby be prevented.

Thus, according to this embodiment, as with the fourth embodiment, it is possible to realize a highly reliable automatic transaction device in which unauthorized processing will not be performed even when the ATM application 40 of FIG. 8 or device control software such as the I/O control unit control software 41 and the paper currency processing unit control software 126 are fraudulently falsified with malware. Note that the payee's card number in the foregoing embodiment is an example of the payee information as the information capable of identifying the payee, and may also be the payee's account information.

(6) Other Embodiments

Note that, while the foregoing first to fifth embodiments explained cases of configuring the ATM 111, 231, 254 as shown in FIG. 7 or FIG. 17, the present invention is not limited thereto, and various other configurations may be broadly applied as the configuration of the ATM 111, 231, 254.

Furthermore, while the foregoing first to fifth embodiments explained cases of performing the withdraw transaction or the deposit transaction based on the flow of processing described above with reference to FIG. 15, FIG. 16, FIG. 21A and FIG. 21B, FIG. 24A and FIG. 24B, or FIG. 27A and FIG. 27B, the present invention is not limited thereto, and the withdraw transaction or the deposit transaction may also be performed based on the flow of various other types of processing to the extent that such processing does not deviate from the subject matter of the present invention. In particular, while examples of certain devices were explained, other devices may also be used to the extent that such devices do not deviate from the subject matter of the present invention. Moreover, upon verifying the credit information, the credit information may be decoded prior to performing the verification processing. Moreover, because an IC card is used by being inserted into a card reader, the IC card and the card reader may be deemed to be a single device.

Moreover, in the first to third embodiments, as explained in FIG. 5, because the withdraw amount input based on the user's operation is received by a pin pad or the like, rather than generating the withdraw amount credit information with the card reader, the withdraw amount credit information may also be generated with the pin pad. Specifically, the present invention is characterized in that the pin pad stores the withdraw amount, which was received based on the user's operation, in the pin pad's storage unit such as a memory, receives the result of the transaction feasibility that was determined by the card reader or the IC card, encrypts the withdraw amount stored in the pin pad's storage unit with a first encryption key that is shared with the paper currency processing unit, and sends the encrypted withdraw amount as the withdraw amount credit information to the paper currency processing unit, and the paper currency processing unit pays out the paper currencies according to the first command when there is any contradiction (or a match) between the information related to the withdraw amount included in the first command sent from the overall control unit and the withdraw amount credit information. More specifically, the processing corresponding to S83 to S88 of the first embodiment and S160 to S165 of the third embodiment is performed by the pin pad in substitute for the card reader or the IC card. In the second embodiment, the processing of S114 to S118 related to the generation of the EPP withdraw amount credit information is not performed, and alternatively the transaction verification result, and not the withdraw amount, is received in S121.

Furthermore, while the foregoing fourth and fifth embodiments explained a case of applying the present invention to the automatic transaction system 110 of the first embodiment, the present invention is not limited thereto, and, for example, the subject matter of the fourth or fifth embodiment may also be applied to the automatic transaction system 230 of the second embodiment or the automatic transaction system 250 of the third embodiment.

Moreover, while the foregoing fourth and fifth embodiments explained a case including the deposit retention processing, if the paper currency processing unit does not have a temporary stacker, the paper currency processing unit may retain the paper currencies in a cashbox, and not in a temporary stacker, upon counting the number of deposited paper currencies, and the ATM control unit may determine that the paper currencies retained in the cashbox are to be managed by the bank (determine that the deposit has been received or that the deposit is complete) when the transaction verification result in S58 indicates that the deposit is possible, and return the paper currencies retained in the cashbox to the customer when it is determined that the deposit is not possible. In other words, the paper currency processing unit 12 completes the deposition processing without performing the paper currency retention processing of transferring the paper currencies from the temporary stacker to the cashbox.

Furthermore, while the foregoing fifth embodiment explained a case of generating and verifying credit information in relation to both the information for identifying the amount of deposit and the information for identifying the account, the present invention is not limited thereto, and credit information may be generated and verified in relation to one of either the information for identifying the amount of deposit or the information for identifying the account.

Furthermore, while the foregoing first to fifth embodiments explained a case of exchanging data between devices via the ATM control unit 112, 232, 260, the present invention is not limited thereto, and it is also possible to provide a physical wire connection between the devices and directly exchange data between the devices without going through the ATM control unit 112, 232, 260.

When a physical wire connection is provided between the devices and data is directly exchanged between the devices without going through the ATM control unit as described above, in the same manner as the foregoing first to fifth embodiments, information (withdraw amount, deposit amount, deposit destination card number) related to the transaction generated or acquired by one terminal is encrypted to generate first credit information, and the other terminal acquires information related to the transaction or acquires the device control information and the first credit information, and confirms the match between the information related to the transaction or the device control information and the information related to the transaction acquired by decrypting the first credit information or the device control information, determines that the transaction is possible or the device control is possible when it is a match, and notifies the ATM control unit that the processing may be continued.

Specifically, in S88 to S92 of FIG. 15, while the withdraw amount credit information is sent from the card reader control unit 130 and received by the paper currency processing unit 113 via the ATM control unit 112, the withdraw amount credit information may also be sent from the card reader control unit 130 and received by the paper currency processing unit 113 without going through the ATM control unit 112.

In the case of FIG. 16, while the withdraw amount credit information is sent from the card reader control unit 241 and received by the encryption pin pad 235 via the ATM control unit 232 in S118 to S121, the withdraw amount credit information may also be sent from the card reader control unit 241 and received by the encryption pin pad 235 without going through the ATM control unit 232. Furthermore, while the withdraw amount credit information is sent from the encryption pin pad 235 and received by the paper currency processing unit 234 via the ATM control unit 232 in S124 to S92 (FIG. 15), the withdraw amount credit information may also be sent from the encryption pin pad 235 and received by the paper currency processing unit 234 without going through the ATM control unit 232.

In the case of FIG. 21A and FIG. 21B, while the withdraw amount credit information is sent from the card reader control unit 290 and received by the paper currency processing unit 261 via the ATM control unit 260 in S165 to S169, the withdraw amount credit information may also be sent from the card reader control unit 290 and received by the paper currency processing unit 261 without going through the ATM control unit 260.

Figure 24A:
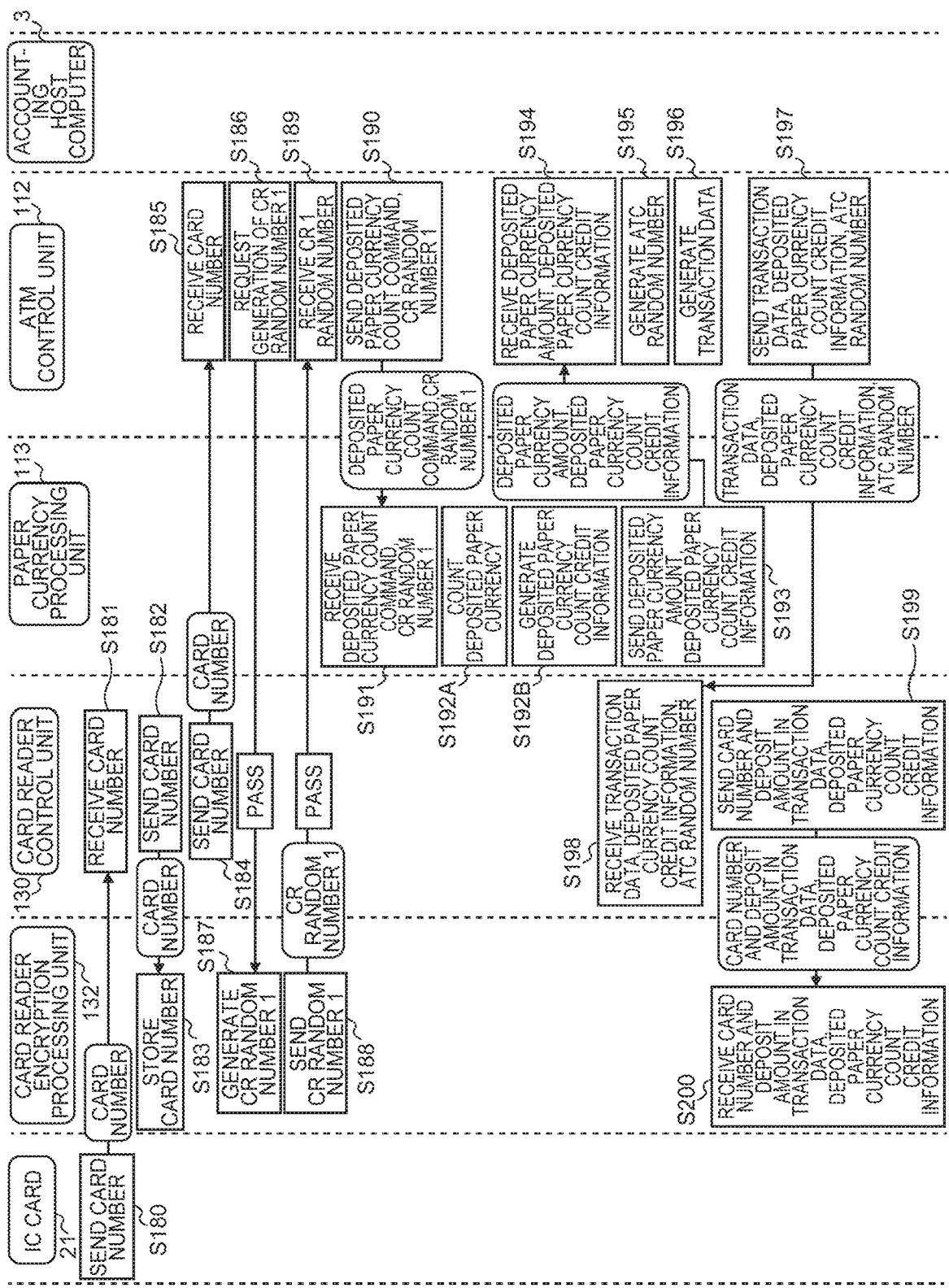
FIG. 24A is a flowchart showing a flow of the ATM deposit transaction processing in the fourth embodiment.

In the case of FIG. 24A and FIG. 24B, while the deposited paper currency amount credit information is sent from the paper currency processing unit 113 and received by the card reader control unit 130 via the ATM control unit 112 in S193 to S198, the deposited paper currency amount credit information may also be sent from the paper currency processing unit 113 and received by the card reader control unit 130 without going through the ATM control unit 112.

Figure 27A:
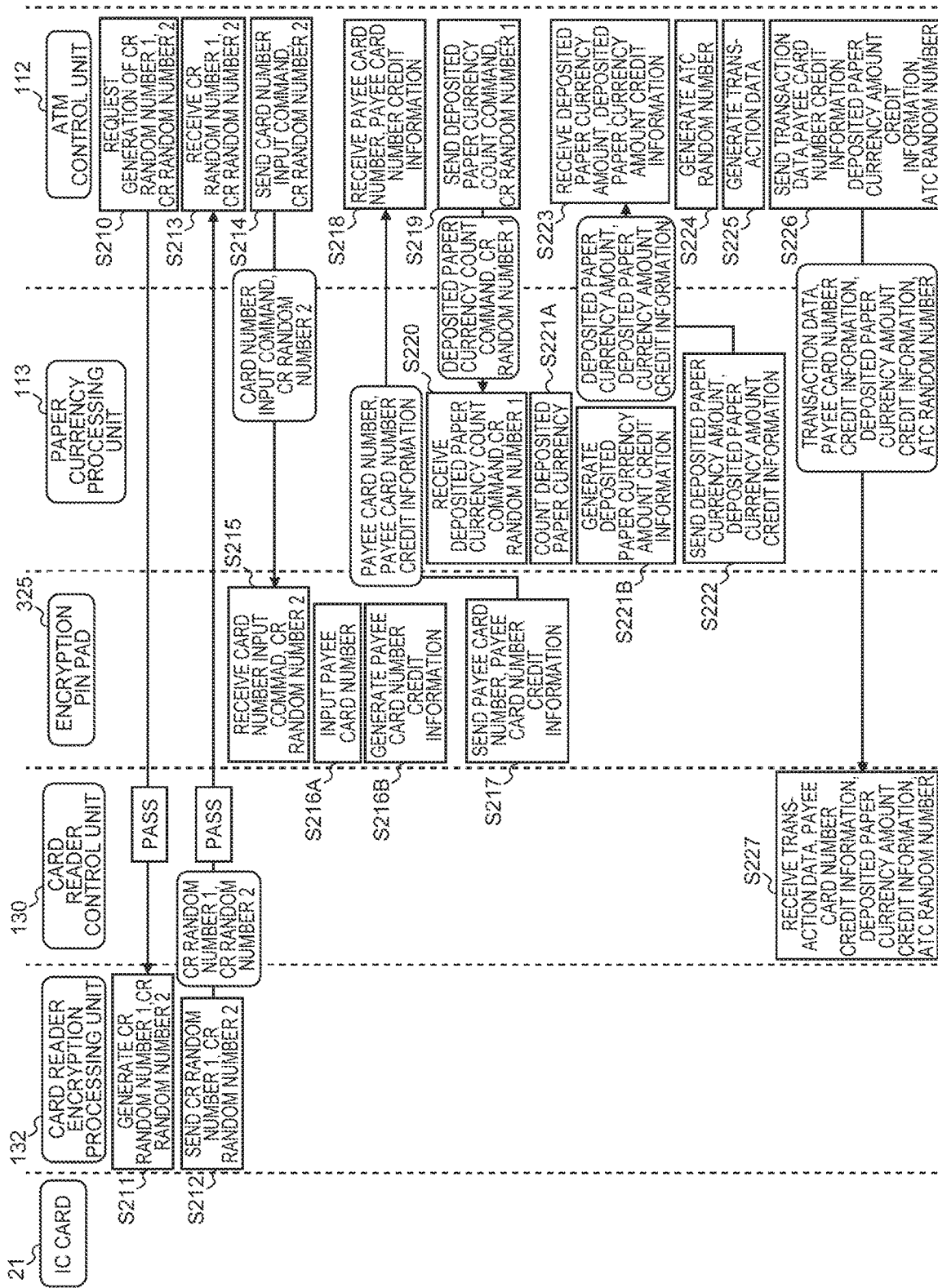
FIG. 27A is a flowchart showing a flow of the ATM deposit transaction processing in the fifth embodiment.
Figure 27B:
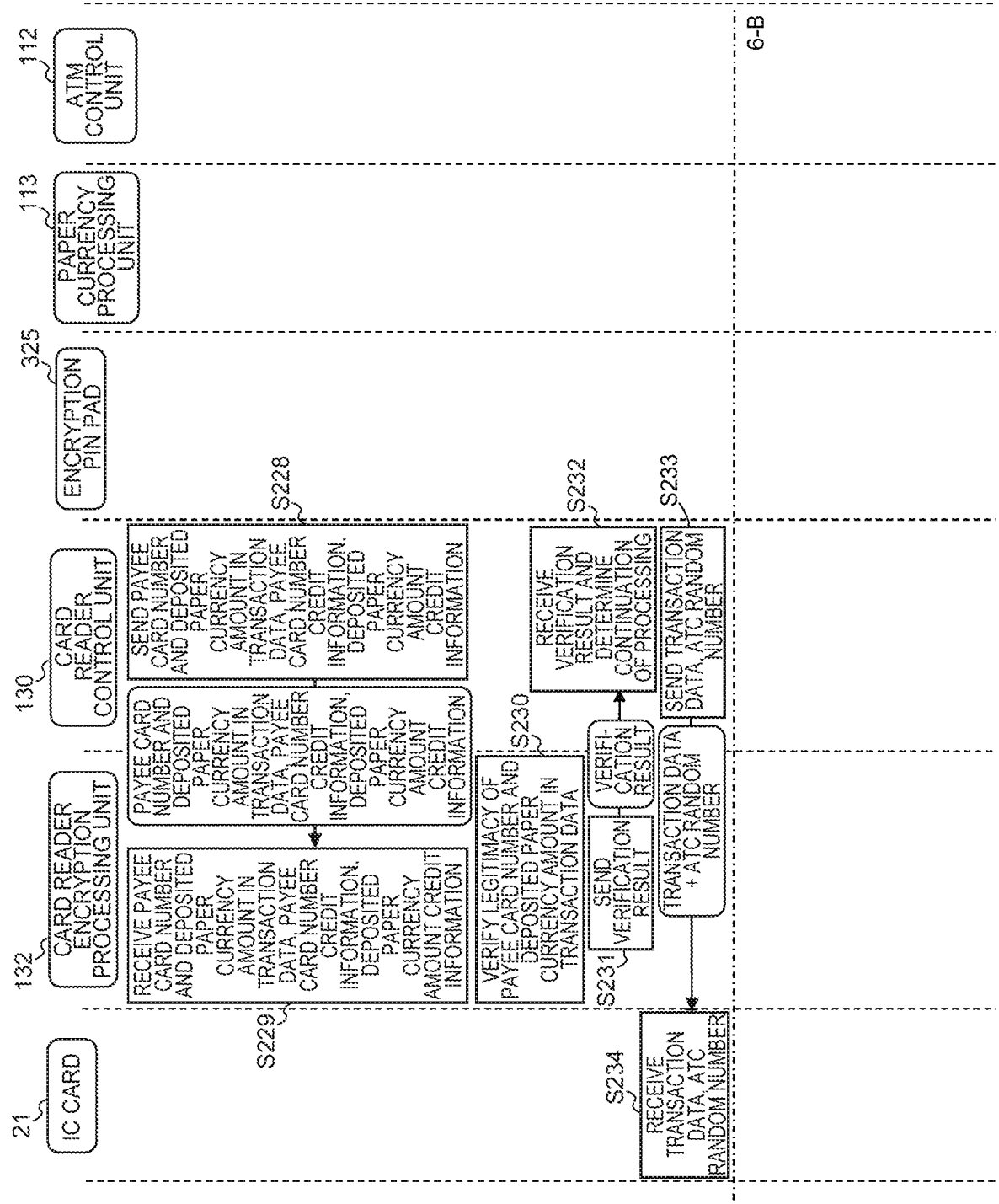
FIG. 27B is a flowchart showing a flow of the ATM deposit transaction processing in the fifth embodiment.

In the case of FIG. 27A and FIG. 27B, while the payee card number credit information is sent from the encryption pin pad 325 and received by the card reader control unit 130 via the ATM control unit 112 in S217 to S227, the payee card number credit information may also be sent from the encryption pin pad 325 to the card reader control unit 130 without going through the ATM control unit 112. Otherwise, while the deposited paper currency amount credit information is sent from the paper currency processing unit 113 and received by the card reader control unit 130 via the ATM control unit 112 in S222 to S227, the deposited paper currency amount credit information may also be sent from the paper currency processing unit 113 and received by the card reader control unit 130 without going through the ATM control unit 112.

(7) Characteristics of Each Embodiment

The foregoing first to fifth embodiments and other embodiments have at least the following characteristics.

Rather than the transaction data itself, only important parameters (withdraw amount, deposit amount, deposit destination card number) included in the transaction data are directly exchanged in inter-device cryptographic communication, and the device detects any contradiction (or match) between the withdraw amount of the transaction data and the withdraw amount of the withdraw command during a withdraw (=denomination×total number of paper currencies) or any contradiction (or match) between the transaction data and the deposited paper currency count result or the deposit destination card number during deposit (remittance).

Moreover, the automatic transaction device according to the present invention is characterized in comprising a main body control unit (for example, ATM control unit) which generates first withdraw transaction data including amount information as information related to an amount in a withdraw transaction and a withdraw command for instructing a withdraw of a paper currency based on the first withdraw transaction data (for example, amount information), a paper currency processing unit which receives the withdraw command and pays out the paper currency, and a first device (for example, IC card, card reader, encryption pin pad or the like) which is a device that is different from the paper currency processing unit and which determines a feasibility of a withdraw based on the first withdraw transaction data sent from the main body control unit, wherein, when the first device determines that the withdraw is possible, the first device generates withdraw credit information (for example, withdraw amount credit information, EPP withdraw amount credit information) with security that is higher than the withdraw command based on the first withdraw transaction data, and wherein the paper currency processing unit receives the withdraw credit information and the withdraw command, additionally determines the feasibility of the withdraw based on the withdraw credit information and the withdraw command, and pays out the paper currency when the withdraw is possible. The amount information may include, for example, the withdraw amount, and the number of paper currencies of each denomination. The withdraw credit information may be encrypted by the first device and decrypted by the paper currency processing unit. Moreover, the withdraw credit information may also include information (for example, withdraw amount, number of paper currencies of each denomination to be paid out, or the like) capable of identifying the amount of withdraw based on the amount information. Moreover, the paper currency processing unit may determine the match between the amount information based on the withdraw credit information and the amount information based on the withdraw command, and determine that the withdraw is possible when it is a match, and determine that the withdraw is not possible when it is not a match. While the foregoing embodiment provided an explanation mainly regarding the withdraw amount, the number of paper currencies of each denomination to be paid out may also be acquired based on the input information from the customer as with the withdraw amount, and the first to third processing may be performed by using the number of paper currencies of each withdraw denomination in substitute for, or together with, the withdraw amount.

Moreover, the automatic transaction device according to the present invention is characterized in comprising a paper currency processing unit which counts the number of paper currencies deposited by a user and generates deposited paper currency count information based on the counted number of paper currencies, a main body control unit (for example, ATM control unit) which generates first deposit transaction data including the deposited paper currency count information, and a first device (for example, IC card, card reader, encryption pin pad or the like) which is a device that is different from the paper currency processing unit and which receives the first deposit transaction data and determines a feasibility of a deposition transaction of the paper currencies deposited by the user based on the first deposit transaction data, wherein the paper currency processing unit generates deposited paper currency count credit information (for example, deposited paper currency amount credit information) with security that is higher than the deposited paper currency count information based on the deposited paper currency count information, wherein the first device receives the first deposit transaction data and the deposited paper currency count credit information, and determines the feasibility of the deposit transaction based on the first deposit transaction data and the deposited paper currency count credit information, and wherein the main body control unit receives the feasibility of the deposit transaction determined by the first device, and accepts the deposit of the counted number of paper currencies (manages the deposited paper currencies as the paper currencies to be managed by the bank) when the deposit transaction is possible. The deposited paper currency count information may include the deposit amount and the number of paper currencies of each denomination based on the number of paper currencies counted by the paper currency processing unit. The deposited paper currency count credit information may be encrypted by the paper currency processing unit and decrypted by the first device. Moreover, the deposited paper currency count credit information may include information (for example, deposit amount, number of paper currencies of each deposited denomination) capable of identifying the amount of deposit based on the deposited paper currency count information. The paper currency processing unit may determine the match between the deposited paper currency count information based on the deposit credit information and the deposited paper currency count information included in the first deposit transaction data, and determine that the deposit transaction is possible when it is a match, and determine that the deposit transaction is not possible when it is not a match. While the foregoing embodiment provided an explanation mainly regarding the deposit amount, the number of paper currencies of each deposited denomination may also be acquired based on the information when the paper currency processing unit counted the number of deposited paper currencies, and the fourth and fifth processing may be performed by using the number of paper currencies of each deposited denomination in substitute for, or together with, the deposit amount.

Moreover, the automatic transaction device according to the present invention is characterized in comprising a first device (for example, IC card, card reader, encryption pin pad or the like) which receives an input of payee information for identifying a payee, a second device which is a device that is different from the first device (for example, a device such as an IC card, a card reader or an encryption pin pad that is different from the first device), and a main body control unit (for example, ATM control unit) which generates first deposit transaction data including the payee information, wherein the first device generates withdraw credit information (for example, card number credit information) with security that is higher than the payee information based on the payee information, and wherein the second device determines a feasibility of remittance based on the first deposit transaction data and the payee credit information. The payee information may include, for example, an account number of the payee. The payee credit information may be encrypted by the first device and decrypted by the second device. Moreover, the payee credit information may include information capable of identifying the payee based on the payee information (for example, account number of the payee or the like). The second device determine the match between the payee information based on the payee credit information and the payee information included in the first deposit transaction data, and determine that the deposit transaction is possible when it is a match, and determine that the deposit transaction is not possible when it is not a match.

Moreover, the automatic transaction device according to the present invention is characterized in comprising a first device (for example, paper currency processing unit, encryption pin pad or the like) which receives or generates transaction-related data which characterizes the transaction (for example, information which identifies the amount of deposit, information which identifies the account of the deposit destination, or the like), wherein the automatic transaction device further comprises a second device which is a device that is different from the first device (for example, a device such as a paper currency processing unit, an IC card, a card reader, or an encryption pin pad that is different from the first device), wherein the first device generates transaction credit information (for example, deposited paper currency amount credit information, payee card number credit information) as information based on the data which characterizes the transaction with security that is higher than the data which characterizes the transaction, wherein the second device (for example, IC card, card reader or the like) receives the data which characterizes the transaction and the transaction credit information, and determines a feasibility of a transaction based on the data which characterizes the transaction and the transaction credit information (by comparing the data which characterizes the transaction and the data which characterizes the transaction based on the transaction credit information). The security of the transaction credit information may be increased by being encrypted by the first device and by being decrypted by the second device. The present invention may additionally have the following characteristics.

The present invention is characterized in that, during a withdraw transaction, the overall control unit sends, to the card reader, first transaction data including the withdraw amount according to the user's operation, and sends, to the paper currency processing unit, a first command to the effect that the paper currencies in the request amount should be paid out, the card reader outputs the withdraw amount of a confirmed transaction which was extracted from the first transaction data sent from the overall control unit, and the paper currency processing unit pays out the paper currencies according to the first command when there is no contradiction between the information related to the withdraw amount included in the first command sent from the overall control unit and the withdraw amount output from the card reader. The card reader may also send, to the paper currency processing unit, the withdraw amount of a confirmed transaction by encrypting the withdraw amount of a confirmed transaction with a first encryption key that is shared with the paper currency processing unit. Moreover, the present invention is characterized in that the card reader sends the withdraw amount of a confirmed transaction to the pin pad, the pin pad sends the withdraw amount sent from the card reader to the paper currency processing unit by encrypting the withdraw amount with a second encryption key that is shared with the paper currency processing unit, and the paper currency processing unit pays out the paper currencies according to the first command when there is no contradiction between the information related to the withdraw amount included in the first command sent from the overall control unit and the withdraw amount sent from the pin pad. Moreover, the card reader may also process an electronic signature and a message authentication code related to a telegram for the withdraw transaction to be exchanged with an external computer.

Moreover, the present invention is characterized in that, during a deposit transaction, the overall control unit sends, to the paper currency processing unit, a second command to the effect that the number of deposited paper currencies should be counted, and sends, to the card reader, second transaction data including the deposited paper currency amount based on the result of the counting performed by the paper currency processing unit, and the paper currency processing unit outputs the deposited paper currency amount as the result of the counting of the number of deposited paper currencies based on the second command, and the card reader executes predetermined processing for continuing the deposit transaction when there is no contradiction between the deposited paper currency amount included in the second transaction data sent from the overall control unit and the deposited paper currency amount output from the paper currency processing unit.

As a result of comprising the foregoing characteristics, it is possible to increase the security of the transaction. In other words, in inter-device communication, the security can be increased by generating and verifying credit information pertaining to the transaction data. More specifically, in the case of a withdraw, by generating and verifying credit information pertaining to the transaction data in inter-device communication after the host approves the transaction based on the transaction data, it is possible to increase the security of the transaction data after the host approves the transaction. Meanwhile, in the case of a deposit, by generating and verifying credit information pertaining to the transaction data in inter-device communication before the host approves the transaction based on the transaction data, it is possible to increase the security of the transaction data before the host approves the transaction. The security of the respective transactions can thereby be improved.

INDUSTRIAL APPLICABILITY

The present invention can be broadly applied to automatic transaction devices which perform withdraw transactions and deposit transactions based on information recorded on credit mediums and operations of users.

REFERENCE SIGNS LIST 3, 251 . . . accounting host computer, 14, 235, 325 . . . encryption pin pad, 21 . . . IC card, 110, 230, 250 . . . automatic transaction system, 111, 231, 254 . . . ATM, 112, 232, 260 . . . ATM control unit, 113, 234, 261 . . . paper currency processing unit, 114, 233, 262 . . . card reader, 130, 241, 290 . . . card reader control unit, 132, 240, 292 . . . card reader encryption processing unit, 180 paper currency processing unit control unit, 182 . . . paper currency processing unit encryption processing unit, 252 . . . transaction credit information generation server, 255 . . . magnetic card.

The invention claimed is:
1. A system, comprising:
an automated teller machine (ATM) control unit comprising a first processor and a first memory, the first memory storing instructions that, when executed by the first processor, cause the first processor to perform the functions of:
generating first withdraw transaction data including amount information as information related to an amount in a withdraw transaction and a withdraw command and transmitting the first withdraw transaction data and the withdraw command to a paper currency processing unit,
receiving a user input from a pin pad, the user input comprising the amount in the withdraw transaction;
generating the first withdraw transaction data based on the user input, and sending the first withdraw transaction data to an integrated circuit (IC) card, and
receiving, from a card reader, withdraw credit information and transmitting, to the paper currency processing unit, the withdraw credit information and the withdraw command;
the paper currency processing unit comprising a second processor and a second memory, the second memory storing instructions that, when executed by the second processor, cause the second processor to perform the functions of:
generating a first value;
transmitting the first value to the ATM control unit;
receiving, from the ATM control unit, the withdraw credit information and the withdraw command;
determining a feasibility of the withdraw transaction based on the withdraw credit information and the withdraw command by (i) combining the first value and the amount in the withdraw transaction, (ii) determining a hash value of a combination of the first value and the amount in the withdraw transaction, (iii) decrypting the withdraw credit information using a corresponding encryption key to a first encryption key, (iv) comparing the decrypted withdraw credit information with the hash value, and (v) determining the feasibility of the withdraw transaction based on a determination of whether the decrypted withdraw credit information and the hash value match;
paying out a paper currency based on the determination of the feasibility of the withdraw transaction;
the card reader comprising a third processor and a third memory, the third memory storing instructions that, when executed by the third processor, cause the third processor to perform the functions of:
generating the withdraw credit information;
(i) receiving the first value from the ATM control unit, (ii) receiving an indication that the withdraw transaction has been verified from the IC card; generating based on the received indication the withdraw credit information by encrypting, using the first encryption key, the combination of the first value and the amount in the withdraw transaction, and (iii) transmitting the withdraw credit information to the ATM control unit;
the IC card comprising a fourth processor and a fourth memory, the fourth memory storing instructions that, when executed by the fourth processor, cause the fourth processor to perform the functions of:
verifying the withdraw transaction based on the first withdraw transaction data and sending the indication that the withdraw transaction has been verified to the card reader; and
the pin pad comprising a fifth processor and a fifth memory, the fifth memory storing instructions that, when executed by the fifth processor, cause the fifth processor to perform the functions of:
receiving user input information and encrypting the received user input information using an encryption key;
receiving the withdraw credit information and the first withdraw transaction data, and verifying the withdraw transaction based on the withdraw credit information and the first withdraw transaction data.

2. The system according to claim 1,
wherein the first withdraw transaction data comprises a card number of the IC card, and
the third processor further executing the instructions to perform the functions of:
verifying the withdraw transaction by comparing the card number to a corresponding card number stored in the third memory of the card reader.

3. The system according to claim 1,
the second processor further executing the instructions to perform the functions of:
determining a number of paper currencies;
generating deposited paper currency count information based on the determined number of paper currencies; and
generating deposited paper currency count credit information by encrypting the deposited paper currency count information;
the first processor further executing the instructions to perform the functions of:
receiving the deposited paper currency count information, and
generating first deposit transaction data including the deposited paper currency count information;
the third processor further executing the instructions to perform the functions of:
receiving the first deposit transaction data and the deposited paper currency count credit information;
decrypting the deposited paper currency count credit information;
comparing the decrypted deposited paper currency count credit information with the deposited paper currency count information of the first deposit transaction data;
determining a feasibility of a deposit transaction based on the comparison between the decrypted deposited paper currency count credit information and deposited paper currency count information; and
transmitting the feasibility of the deposit transaction to the ATM control unit, and
the first processor further executing the instructions to perform the functions of:
receiving the feasibility of the deposit transaction determined by the card reader; and
accepting a deposit of the determined number of paper currencies when the deposit transaction is possible.

4. The system according to claim 1,
the fifth processor further executing the instructions to perform the functions of:
receiving a user input of payee information for identifying a payee;
generating payee credit information by encrypting the payee information; and
transmitting the payee credit information to the card reader;
the first processor further executing the instructions to perform the functions of:
receiving the payee information and the payee credit information;
generating first deposit transaction data including the payee information;
transmitting the first deposit transaction data to the card reader; and
the third processor further executing the instructions to perform the functions of:
receiving the first deposit transaction data and the payee credit information;
determining a feasibility of remittance by decrypting the payee credit information; and
comparing the decrypted payee credit information to the first deposit transaction data.

5. A control method of a system comprising:
generating by an ATM control unit, first withdraw transaction data including amount information as information related to an amount in a withdraw transaction and a withdraw command and transmitting the first withdraw transaction data and the withdraw command to a paper currency processing unit;
receiving by the ATM control unit a user input from a pin pad, the user input comprising the amount in the withdraw transaction;
generating by the ATM control unit, the first withdraw transaction data based on the user input, and sending the first withdraw transaction data to an integrated circuit (IC) card; and
receiving by the ATM control unit from a card reader, withdraw credit information and transmitting, to the paper currency processing unit, the withdraw credit information and the withdraw command;
generating by the paper currency processing unit, a first value;
transmitting by the paper currency processing unit, the first value to the ATM control unit;
receiving, by the paper currency processing unit, from the ATM control unit, the withdraw credit information and the withdraw command;
determining by the paper currency processing unit, a feasibility of the withdraw transaction based on the withdraw credit information and the withdraw command by (i) combining the first value and the amount in the withdraw transaction, (ii) determining a hash value of a combination of the first value and the amount in the withdraw transaction, (iii) decrypting the withdraw credit information using a corresponding encryption key to a first encryption key, (iv) comparing the decrypted withdraw credit information with the hash value, and (v) determining the feasibility of the withdraw transaction based on a determination of whether the decrypted withdraw credit information and the hash value match;
paying out by the paper currency processing unit, a paper currency based on the determination of the feasibility of the withdraw transaction;
generating by the card reader, the withdraw credit information; (i) receiving by the card reader, the first value from the ATM control unit; (ii) receiving by the card reader, an indication that the withdraw transaction has been verified from the IC card; generating based on the received indication the withdraw credit information by encrypting, using the first encryption key, the combination of the first value and the amount in the withdraw transaction, and (iii) transmitting by the card reader, the withdraw credit information to the ATM control unit;
verifying by the IC card, the withdraw transaction based on the first withdraw transaction data and sending the indication that the withdraw transaction has been verified to the card reader; and
receiving by the pin pad, user input information and encrypting the received user input information using an encryption key;
receiving by the pin pad, the withdraw credit information and the first withdraw transaction data, and verifying the withdraw transaction based on the withdraw credit information and the first withdraw transaction data.

6. The control method according to claim 5,
wherein the first withdraw transaction data comprises a card number of the IC card; and
wherein the control method further comprises verifying, by the card reader, the card number by comparing the card number to a corresponding card number stored in the third memory of the card reader.

7. The control method according to claim 5, the control method further comprising:
determining, by the paper currency processing unit, a number of paper currencies
generating, by the paper currency processing unit, deposited paper currency count information based on the determined number of paper currencies,
generating, by the paper currency processing unit, deposited paper currency count credit information by encrypting the deposited paper currency count information,
receiving, by the ATM control unit, the deposited paper currency count information,
generating, by the ATM control unit, first deposit transaction data including the deposited paper currency count information,
receiving, by the card reader, the first deposit transaction data and the deposited paper currency count credit information,
decrypting, by the card reader, the deposited paper currency count credit information,
comparing, by the card reader, the decrypted deposited paper currency count credit information with the deposited paper currency count information of the first deposit transaction data,
determining, by the card reader, a feasibility of a deposit transaction based on the comparison between the decrypted deposited paper currency count credit information and deposited paper currency count information,
transmitting, by the card reader, the feasibility of the deposit transaction to the ATM control unit,
receiving, by the ATM control unit, the feasibility of the deposit transaction determined by the card reader, and
accepting, by the ATM control unit, the deposit of the determined number of paper currencies when the deposit transaction is possible.

8. The control method according to claim 5, the control method further comprising:
receiving, by the pin pad, a user input of payee information for identifying a payee,
generating, by the pin pad, payee credit information by encrypting the payee information,
transmitting, by the pin pad, the payee credit information to the card reader;
receiving, by the ATM control unit, the payee information,
generating, by the ATM control unit, first deposit transaction data including the payee information,
transmitting, by the ATM control unit, the first deposit transaction data to the card reader;
receiving, by the card reader, the first deposit transaction data and the payee credit information; and
determining, by the card reader, a feasibility of remittance by decrypting the payee credit information and comparing the decrypted payee credit information to the first deposit transaction data.

* * * * *